(12) United States Patent  
Kurita

(10) Patent No.: US 7,509,408 B2
(45) Date of Patent: Mar. 24, 2009

(54) SYSTEM ANALYSIS APPARATUS AND METHOD

(75) Inventor: Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 11/475,956

(22) Filed: Jun. 28, 2006

(65) Prior Publication Data

US 2007/0214257 A1    Sep. 13, 2007

(30) Foreign Application Priority Data

Mar. 10, 2006    (JP)    ............................. 2006-65446

(51) Int. Cl.
*G06F 15/173*    (2006.01)
(52) U.S. Cl. .................. 709/223; 709/224; 709/229; 370/229; 370/235
(58) Field of Classification Search ................ 709/223, 709/224, 203, 217, 229; 370/229, 235, 389
See application file for complete search history.

(56) References Cited

U.S. PATENT DOCUMENTS

| | | | | |
|---|---|---|---|---|
| 5,787,253 A * | 7/1998 | McCreery et al. ........... 709/231 |
| 5,884,025 A * | 3/1999 | Baehr et al. .................... 726/13 |
| 6,128,298 A * | 10/2000 | Wootton et al. ............. 370/392 |
| 6,874,026 B2 * | 3/2005 | Maria et al. .................. 709/225 |
| 6,882,654 B1 * | 4/2005 | Nelson ........................ 370/401 |
| 6,917,971 B1 * | 7/2005 | Klein .......................... 709/224 |
| 7,165,100 B2 * | 1/2007 | Cranor et al. ............... 709/223 |
| 2005/0289231 A1 * | 12/2005 | Harada et al. ............... 709/224 |

FOREIGN PATENT DOCUMENTS

| JP | 09-128342 | 5/1997 |
|---|---|---|
| WO | WO 01/86877 | 11/2001 |

* cited by examiner

*Primary Examiner*—Lashonda T Jacobs
(74) *Attorney, Agent, or Firm*—Staas & Halsey LLP

(57) ABSTRACT

In a system analysis apparatus, a per-SrcIP filter section captures packets in client-Web server segments on a per-SrcIP basis. An ON/OFF filter section allows captured packets to pass through only when its flag is set to "ON". A request/response analysis section controls a flag of the ON/OFF filter section of the next segment so that the packets of the next segment are captured only when the present segment is in a response waiting statue. A range control section controls a SrcIP range of packets to be captured by the per-SrcIP filter section.

16 Claims, 18 Drawing Sheets

| Ether Header | IP Header | TCP Header | TCP Data |
|---|---|---|---|

FIG.5A

| Version | Header Length | Type of Service | Data Length | |
|---|---|---|---|---|
| ID (Identification) | | | Flag | Flagment Offset |
| Time to Live | | Protocol | Header Checksum | |
| Source IP Address (SrcIP) | | | | |
| Destination IP Address (DstIP) | | | | |
| Option | | | | Padding |

FIG.5B

| Source Port Number (SrcPort) | | Destination Port Number (DstPort) | |
|---|---|---|---|
| Sequence Number | | | |
| Acknowledge Number | | | |
| Header Length | Reserved | Flag | Window |
| Checksum | | Urgent Pointer | |
| Option | | | |

FIG.5C

| URG (Urgent Flag) | ACK (Acknow-ledgement Flag) | PSH (Push Flag) | RST (Reset Flag) | SYN (Synchronize Flag) | FIN (Fin Flag) |
|---|---|---|---|---|---|

FIG.5D

STATUS MANAGEMENT TABLE 80

| ID NUMBER | SOURCE IP ADDRESS (CLIENT-SIDE) | DESTINATION IP ADDRESS (WEB SERVER-SIDE) | SOURCE PORT NUMBER | DESTINATION PORT NUMBER | TCP/UDP STATUS | MESSAGE STATUS |
|---|---|---|---|---|---|---|
| 1 | 192.168.10.1 | 192.168.1.1 | 2001 | 80 | Connected | Resp-wait |
| 2 | 192.168.10.2 | 192.168.1.1 | 3211 | 80 | Connected | NO-Resp-wait |
| 3 | 192.168.10.3 | 192.168.1.1 | 2500 | 80 | Connecting | N/A |

FIG.9

SIGNAL TABLE 81

| SIGNAL ISSUANCE TIME (HOUR.MINUTE.SECOND) | TYPE |
|---|---|
| 12.35.01:000 | ACTIVATION |
| 12.37.21:122 | ON SIGNAL |
| 12.38.05:211 | OFF SIGNAL |
| 12.40.47:332 | ON SIGNAL |
| 12.4519:544 | OFF SIGNAL |
| ⋮ | ⋮ |

FIG.10

SYSTEM ANALYSIS APPARATUS AND METHOD

CROSS-REFERENCE TO RELATED APPLICATIONS

This application claims priority from Japanese patent application Serial no. 2006-065446 filed Mar. 10, 2006, the contents of which are incorporated by reference herein.

BACKGROUND OF THE INVENTION

1. Field of the Invention

The present invention relates to a system analysis apparatus and a system analysis method for capturing flowing packets and performing transaction analysis in a multi-tiered server system connected to a high-speed network which exceeds, for instance, 1 Gbps (Giga bit per second). A multi-tiered server system is, for instance, a system in which servers configured in three tiers, namely a Web server, an application server (AP server) and a database server (DB server), perform predetermined processing by distributing the processing among the tiers.

2. Description of the Related Art

In a multi-tiered server system, system performance is analyzed by capturing flowing packets, performing packet analysis or transaction analysis, and either analyzing or visualizing the results thereof.

In packet analysis, captured packets are used for performing message-level analysis of TCP, application protocols (e.g., HTTP) or the like. In transaction analysis, the captured packets are used to analyze a processing time for each server or calling relationships among processing objects (OBJ) within each server on a per-transaction basis, such as operation A or B. In this description, transaction is defined as an association of a series of processing performed in response to a request from a client.

The result of the packet analysis or transaction analysis is either analyzed or visualized. For instance, the processing time of each server or calling relationships among processing objects (OBJ) within each server are visualized as system performance. Bottleneck analyses, tendency predictions and the like also fall into the same category of analysis or visualization processing. Such system analyses may be utilized when proposing countermeasures for systems in relation to determining problematic areas, adding required resources or switching networks.

There are two methods for analyzing systems. The first method involves temporarily storing captured packets into a disk or the like, and subsequently reading out the packets to perform packet analysis, transaction analysis and analysis/visualization. This method is called "cumulative analysis". The second method involves performing packet analysis, transaction analysis, and analysis or visualization of captured packets in real-time and displaying the analysis results. This method is called "real-time analysis".

As a conventional technique for capturing packets and performing transaction analysis, a technique related to a transaction tracing apparatus capable of easily extracting and analyzing an application log for a desired transaction from communication information collected from a transmission circuit, without consideration of protocol or application, has been described (for instance, refer to Patent Document 1: Japanese Patent Laid-Open No. 9-128342).

An example of system analysis in a multi-tiered server system will now be described in detail.

FIG. 15 is a diagram showing an example of a system to which a system analysis apparatus may be applied. This system is a multi-tiered server system comprised of a Web server 131, an AP server 132 and a DB server 133. It is assumed that the system is capable of communicating with a client 140 via a network 150. A system analysis apparatus 110 captures packets flowing through a client 140-Web server 131 segment, a Web server 131-AP server 132 segment, and an AP server 132-DB server 133 segment. Transaction analysis is performed on the captured packets to analyze processing time for each server, or calling relationships among processing objects (OBJ) within each server on a per-transaction basis, such as operation A or B. A transaction is defined as an association of a series of processing performed in response to a request from a client 140.

FIG. 16 is a diagram showing a flow of system analysis processing. The system analysis apparatus 110 captures packets flowing through the client 140-Web server 131 segment, the Web server 131-AP server 132 segment, and the AP server 132-DB server 133 segment (P100). Packet analysis is performed on the captured packets (P101). Packet analysis is analysis processing performed at the message levels of TCP, application protocols (e.g., HTTP) or the like. The results of packet analysis are recorded as a protocol log 200. Next, transaction analysis is performed on the captured packets (P102). Transaction analysis is analysis processing performed in order to identify nesting relationships of messages, to extract transactions using matching or the like, and to associate objects. The results of transaction analysis are recorded as protocol correlation log/transaction data 210. Finally, the result of the packet analysis or transaction analysis is either analyzed or visualized (P103). In this example, the processing time of each server or calling relationships among processing objects (OBJ) within each server and the like are visualized as system performance.

FIGS. 17A and 17B are diagrams showing examples of visualization output of analysis results. In FIG. 17A, the total processing time of an operation transaction, respective processing times of the servers, and network time for each segment are visualized as transaction-based information. In FIG. 17B, calling relationships among objects and processing time for each object are visualized as object-based information.

In the system analysis apparatus 110 of FIG. 15, when attempting to capture all flowing packets using software, the system will reach its limit as packet communication speed approaches approximately 1 Gbps. In systems where communication speeds exceed 1 Gbps, it is difficult to directly capture packets using a single system analysis apparatus. In addition, there are no commercially available products for packet capturing processing which have capturing capabilities in excess of 1 Gbps. Therefore, as methods for capturing packets to perform transaction analysis in high-speed network systems with speeds in excess of 1 Gbps, two different methods for different uses may be contemplated, as shown in FIGS. 18A and 18B.

As shown in FIG. 18A, the first method captures all packets and performs analysis by either distributing processing load among a plurality of apparatuses or implementing processing in hardware. While this method results in an increase in processing load, the method is effective if it is desired to perform analysis by reliably capturing all events. As shown in FIG. 18B, the second method samples packets on a per-transaction basis, and performs analysis statistically by reducing processing load required for capturing and analyzing. This method is effective when it is desired to reduce processing load for assessing tendencies based on statistical information such as connection time.

In the first method shown in FIG. 18A, the sorting apparatus 300 of a previous stage sorts packets among the plurality of capture/analysis apparatuses 310 of a subsequent stage. This improves overall processing performance. The processing performed by the sorting apparatus 300 is a determination function in which packets are sorted according to a predefined sorting logic, and has a lighter processing load than the capture/analysis apparatuses 310 which handle processing such as memory copying or writing to disks. While the processing ceiling of the capture/analysis apparatuses 310 are around 1 Gbps, commercially available sorting apparatuses 300 have processing capabilities of around 4 Gbps. In addition, higher processing speeds may by achieved by implementing the sorting apparatus 300 as a hardware using ASIC or the like, and increasing the number of units of the capture/analysis apparatuses 310 of the subsequent stage.

In the second method shown in FIG. 18B, inputted packets are thinned out according to a predetermined rule to reduce overall throughput, and an overall tendency is estimated from a subset of collected inputted packets. Processing capability is enhanced by performing analysis statistically. These are all performable within a single capture/analysis apparatus 320. A sampling section 321 may be considered as being capable of having a similar throughput to the sorting apparatus 300 of a previous stage of FIG. 18A. Thus, a rough indication of its processing capability would be approximately 4 Gbps. Processing at the capture/analysis section 322 after sampling also depends on the sampling rate, and the lower the sampling rate, the lighter the processing load. For instance, inputted packets of 4 Gbps may be brought down to 400 Mbps by sampling at 10 percent. A rough indication of the processing capability in regards to packets after sampling would be approximately 1 Gbps. As in the case of FIG. 18A, higher processing speeds may by achieved by implementing the sampling processing portion as hardware.

The above-described second method will now be further considered. In order to realize the above-described second method in system analysis, it is necessary to perform sampling processing on a per-transaction basis. In other words, when capturing packets, packets are ideally sampled on a per-transaction basis through processing performed as close to real time as possible.

However, this has not been realized due to problems such as (a) to (d) described below.

(a) Examples of sampling techniques include sFlow by IETF. However, sFlow only performs sampling on a per-packet basis, and is incapable of performing sampling on a per-transaction basis, in other words, sampling of groups of packets containing a series of processing flows on a per-group basis.

(b) As an inherent characteristic of transaction analysis, transactions may be determined only after all or a certain amount of packets are captured and transaction analysis is performed collectively on the captured packets.

(c) Since different TCP connections may belong to the same transaction, transactions cannot be defined on a per-TCP connection basis.

(d) Since source IP addresses (hereinafter referred to as SrcIP) and destination IP addresses (hereinafter referred to as DstIP) are respectively the IP addresses of servers and remain constant through all transactions, transactions may not be separated by IP addresses in a Web server-AP server segment and an AP server-DB server segment.

SUMMARY OF THE INVENTION

An object of the present invention is to solve the above-described problems, and provide a technique for performing system analysis on a multi-tiered server system which enables system analysis to be performed on a per-transaction basis at light processing loads by allowing packet sampling on a per-transaction basis, without requiring an enormous number of apparatuses.

For the purpose of solving the above-described problems, in a multi-tiered server system which performs predetermined processing in response to a request from a client by distributing the processing among servers configured in multiple tiers, the present invention performs sampling in a client-multi-tiered server system segment on a per-source IP address (SrcIP) basis of request packets from the client, or in other words, sampling on a per-client IP address basis, and performs sampling in a server-server segment of the multi-tiered server system only when the previous segment is in a request waiting state.

More specifically, a system analysis apparatus according to the present invention comprises: 1) a network interface section which separates packets mirrored from packets flowing in client-server segments, which are data communication segments between a client and a server of the multi-tiered server system where the server is a request transmission target of the client, or server-server segments, which are data communication segments between servers of adjacent tiers in the multi-tiered server system, into each segment, and acquires the packets; 2) a first filter section which filters packets flowing through the client-server segments based on address information of the client which is the source of the packets; 3) a second filter section in which an ON period during which packets flowing through the server-server segments are acquired and an OFF period during which the packets are discarded are switchably set by an external control signal, where the second filter section filters the packets in response to settings of the ON period or the OFF period; 4) a request/response analysis section which determines packets acquired from a single segment related in advance to the request/response analysis section among the client-server segments or the server-server segments, identifies a response waiting period of the request transmitting side of the aforementioned segment based on a message status of the packets, and controls the settings of the ON period or OFF period of the second filter section, which filters packets of a server-server segment which is next to the aforementioned segment, in conjunction with the response waiting period; and 5) a packet capture section which acquires packets passing through the first filter section or the second filter section.

The system analysis apparatus according to the present invention uses a network interface section to separate packets mirrored from packets flowing in the client-server segments (the segments between the client and a server of the multi-tiered server system) or the server-server segments (the segments between servers of adjacent tiers in the multi-tiered server system) into each segment and to acquire the packets. Packets flowing through the client-server segment are filtered by the first filter section based on address information of the client which is the source of the packets.

The request/response analysis section determines packets acquired from a single segment related in advance to the request/response analysis section among the client-server segments or the server-server segments, identifies a response waiting period of the request transmitting side of the segment to which the request/response analysis section is related, based on the message statuses of the packets, and controls the settings of the ON period or OFF period of the second filter section, which filters packets of a server-server segment which is next to the aforementioned segment, in conjunction with the response waiting period. In the second filter section, an ON period during which packets flowing through the server-server segments are acquired and an OFF period during which the packets are discarded are switchably set by an external control signal, causing the second filter section to filter the packets in response to settings of the ON period or the OFF period. Finally, the packet capture section acquires packets passing through the first filter section or the second filter section. This allows packet sampling to be performed on a per-transaction basis, thereby achieving per-transaction analysis processing for subsequent system analysis. In particular, it becomes possible to reduce the sampling quantity of unnecessary packets while reliably capturing necessary transaction packets.

In addition, the network interface section according to the present invention is provided as a plurality of components which correspond to each segment of the client-server segments and the server-server segments, and each network interface section is capable of acquiring packets mirrored in each corresponding segment.

Moreover, the present invention comprises a segment separation section which separates packets acquired by the network interface section into each segment through which the packets had been flowing. In this case, the network interface section is provided as a single component capable of collectively acquiring packets mirrored from packets flowing through the client-server segments and the server-server segments and sending out the acquired packets to the segment separation section. This makes it possible to perform packet sampling on a per-transaction basis even if there is only one network interface in the system analysis apparatus.

Furthermore, the first filter section according to the present invention is capable of acquiring packets flowing through the client-server segment at a predetermined rate for each source IP address of the packets. This enables packet sampling rates to be arbitrarily or dynamically specified.

In addition, the present invention may comprise a range control section which identifies a response waiting period and a period other than the response waiting period of the client side based on message statuses of packets passed through the first filter section, and changes the predetermined filtering rate of the first filter section so that a ratio of the two periods are at a predetermined ratio. This enables packet sampling rates to be automatically adjusted by changing ranges of client IP addresses, ranges of results of hash operations performed on client IP addresses.

Moreover, the first filter section according to the present invention may comprise a filtering policy which identifies, using all the client IP addresses or a portion thereof, a range of clients from which packets are acquired, in order to acquire packets having source IP addresses matching the filtering policy from the packets flowing through the client-server segments. This makes it possible to arbitrarily specify a range of IP addresses of clients to be sampled.

Furthermore, the first filter section according to the present invention is capable of performing hash operations on the source IP addresses of packets flowing through the client-server segment and acquiring packets for which the hash operation results fall into a predetermined range. This makes it possible to eliminate biases among the IP addresses of clients to be sampled.

The processing performed by the above system analysis apparatus may be achieved using a computer and a software program. In this case, the program may be recorded onto a computer-readable storage media, or otherwise provided through a network.

The present invention enables transaction analysis at light processing loads by achieving per-transaction sampling in a high-speed network exceeding 1 Gbps. In addition, cost reduction may be anticipated, since the present invention enables transaction analysis to be performed with fewer apparatuses. Moreover, even in cases where the functions of the system analysis apparatus according to the present invention is embedded into intermediary apparatuses such as gateways or routers, transaction analysis may be performed with minimal impact to intermediary processing such as routing or QoS (Quality of Service).

BRIEF DESCRIPTION OF THE DRAWINGS

FIGS. 5A to 5D are diagrams showing examples of packet formats:

FIG. 9 is a diagram showing an example of a status management table:

FIG. 10 is a diagram showing an example of a signal table:

DETAILED DESCRIPTION OF THE PREFERRED EMBODIMENTS

Preferred embodiments of the present invention will now be described with reference to the drawings. For the present embodiments, a session is defined as a set of data transmitted and received on a communication path defined by a source IP address and port number and a destination IP address and port number. In addition, a message is defined as a minimum unit of data exchanged among a plurality of apparatuses on a TCP session. For instance, a message may be an HTTP request or a response thereto. Moreover, a transaction is defined as a set of processing performed by each server when a request is made to the system, or in other words, a set of a single or a plurality of processing performed by servers between reception of a message and transmission of a response thereto.

Figure 1:
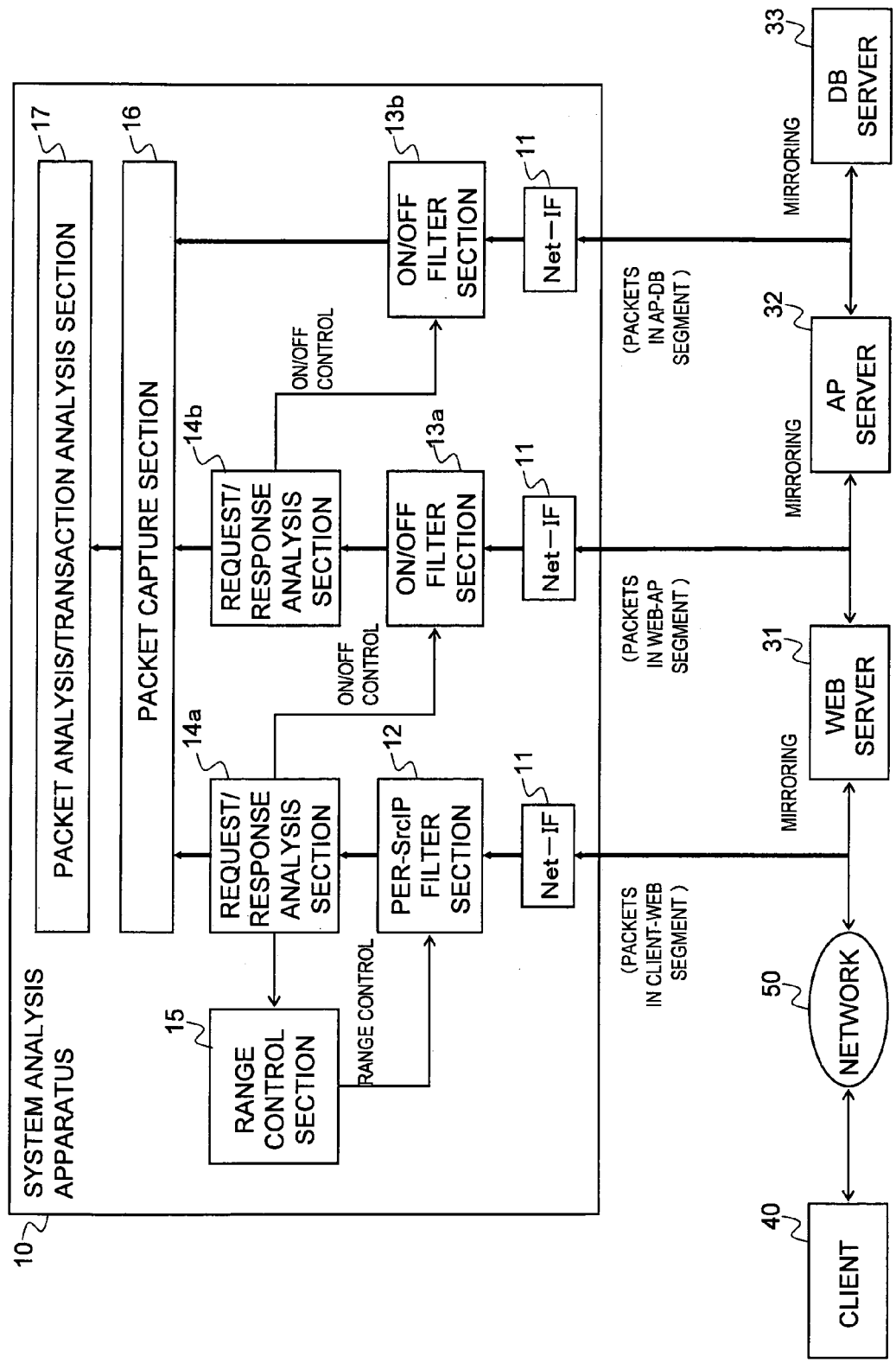
FIG. 1 is an explanatory diagram illustrating a first principle of the present invention.

Firstly, principles of the present invention will be described. FIG. 1 is an explanatory diagram illustrating a first principle of the present invention. A system analysis apparatus 10 according to the first principle of the present invention comprises a network interface section (Net-IF section) 11, a per-source IP filter section (per-SrcIP filter section) 12, ON/OFF filter sections 13 (13a, 13b), request/response analysis sections 14 (14a, 14b), a range control section 15, a packet capture section 16, and a packet analysis/transaction analysis section 17.

The target of system analysis by the system analysis apparatus 10 is a server system which distributes processing among three tiers consisting of a Web server 31, an AP server 32 and a DB server 33. A client 40 transmits a request to the Web server 31 and receives a response from the Web server 31 via a network 50. The Web server 31 transmits a request to the AP server 32, and receives a response from the AP server 32. The AP server 32 transmits a request to the DB server 33, and receives a response from the DB server 33. The per-SrcIP filter section 12, the ON/OFF filter sections 13 (13a, 13b), the request/response analysis sections 14 (14a, 14b) and the range control section 15 of the system analysis apparatus 10 enable packet sampling, and reduces the total number of packets to be captured.

The Net-IF section 11 is processing means for acquiring packets mirrored from packets flowing through a segment to which the Net-IF section 11 has been related in advance (for instance, the client 40-Web server 31 segment, the Web server 31-AP server 32 segment, or the AP server 32-DB server 33 segment).

The per-SrcIP filter section 12 is filtering means for filtering packets inputted from the Net-IF 11 on a predetermined per-source IP (per-SrcIP) basis. Per-SrcIP filtering is defined as filtering performed per SrcIP of requests from the client 40, or in other words, filtering performed per IP address of the client 40.

In FIG. 1, packets mirrored in the client 40-Web server 31 segment are sent to the per-SrcIP filter section 12 via the Net-IF 11. The per-SrcIP filter section 12 performs filtering on a per-SrcIP basis on the received packets. In the client 40-Web server 31 segment, a single transaction is a plurality of TCP connections originating from the same client 40. Therefore, all the packets belonging to the same transaction may be captured by performing filtering on a per-SrcIP basis.

In addition, the per-SrcIP filter section 12 is capable of performing filtering on a per-SrcIP basis at a certain set rate, such as at a rate of ¹/₁₀. Moreover, filtering may be arranged so that, for instance, only packets with SrcIPs falling in a certain range will be captured. Alternatively, hash operations may be performed on the SrcIPs in order to capture only the packets for which the hash operation results fall in a certain range. Sampling performed by using hash operation results reduces biases among the SrcIPs of the packets to be captured.

The ON/OFF filter sections 13 (13a, 13b) are processing means for which an ON period, during which packets flowing through the server-server segments are acquired, and an OFF period, during which the packets are discarded, are switchably set by an external control signal in order to filter the packets according to the settings of the ON period or the OFF period (ON/OFF settings). Whether or not packets inputted from the Net-IF 11 are passed through is determined by the filtering ON/OFF settings. The ON/OFF filter section 13 (13a, 13b) comprises an ON/OFF flag which is set by an external control signal. The ON/OFF flag is set to "ON" for an ON period and to "OFF" for an "OFF" period. Inputted packets are passed through during an ON period, and are discarded during an OFF period.

In FIG. 1, packets mirrored in the Web server 31-AP server 32 segment and the AP server 32-DB server 33 segment are sent to the ON/OFF filter section 13 (13a, 13b) via their respectively corresponding Net-IFs 11. At the ON/OFF filter section 13 (13a, 13b), inputted packets are passed through when the ON/OFF flag is set to "ON".

The request/response analysis section 14 (14a, 14b) is processing means which identifies a request waiting period of the request transmitting side of a segment to which the request/response analysis section 14 (14a, 14b) is related in advance, based on the message statuses of the packets acquired from the segment, and controls the settings of the ON/OFF flag of the ON/OFF filter section 13 (13a, 13b), which filters packets of a server-server segment which is next to the aforementioned segment, in conjunction with the request waiting period. Switching of the ON/OFF flag of filtering performed by the ON/OFF filter section 13 (13a, 13b) is achieved using an inclusion relation of requests/responses.

Figure 2:
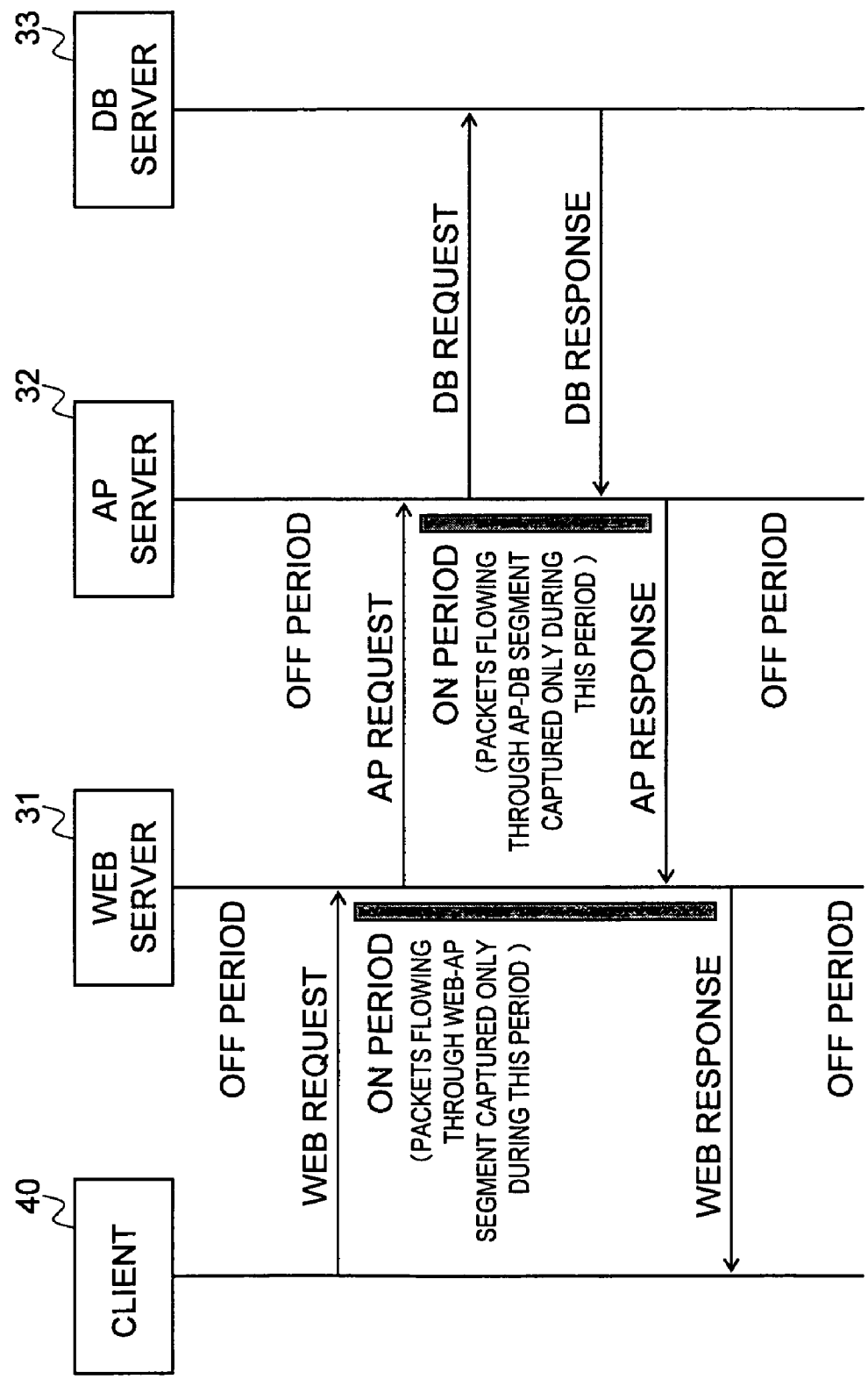
FIG. 2 is a diagram for explaining an inclusion relation of request/response periods of the segments.

FIG. 2 is a diagram for explaining an inclusion relation of request/response periods among the segments. As shown in FIG. 2, a response waiting period of a server of a tier after issuing a request (request issuance/response waiting period) is included in a request issuance/response waiting period of a previous server. Therefore, only when the current tier (current stage) is in a request issuance/response waiting period, packets belonging to the same transaction as the packets captured in the current stage may possibly be captured in the next tier (next stage).

The request/response analysis section 14 (14a, 14b) uses such inclusion relations of request/responses and the results of request/response analysis to send a control signal which switches the ON/OFF flag of the ON/OFF filter section 13 (13a, 13b) corresponding to the next segment so that packets are captured in the next segment (between the server of its own tier and the server of the next tier) only when its own tier (current stage) is in a request issuance/response waiting period. For instance, the request/response analysis section 14a analyzes requests or responses using packets captured in the client 40-Web server 31 segment, and sends a control signal which sets an ON flag to the ON/OFF filter section 13a corresponding to the next segment upon detection of a request (Web request) issuance. In addition, when detecting a response (AP response), a control signal which sets an OFF flag is sent to the ON/OFF filter section 13a. As shown in FIG. 2, the ON/OFF filter section 13a which receives control signals from the request/response analysis section 14a allows captured packets to pass through during its ON period, which starts when its ON/OFF flag is updated to "ON" and ends when the ON/OFF flag is next updated to "OFF".

Similarly, the request/response analysis section 14b analyzes requests or responses using packets which the ON/OFF filter section 13a allowed to pass (packets captured in the Web server 31-AP server 32 segment), and sends a control signal which sets an ON flag to the ON/OFF filter section 13b of the next segment upon detection of a request (AP request) issuance. In addition, when detecting a response (AP response), a control signal which sets an OFF flag is sent. The ON/OFF filter section 13b allows captured packets to pass through only during its ON period. As a result, the packet capture section 16 captures packets in the Web server 31-AP server 32 segment only when the client 40-Web server 31 segment is in a Web response waiting period, and captures packets in the AP server 32-DB server 33 segment only when the Web server 31-AP server 32 segment is in an AP response waiting period. This enables significant reduction in the total quantity of packets to be captured.

However, packets belonging to other transactions may be included in the packets captured by the packet capture section 16. Such packets belonging to other transactions are filtered by the packet analysis/transaction analysis section 17.

The range control section 15 is control means which controls the SrcIP range of packets to be captured by the per-SrcIP filter section 12. The range control section 15 adjusts packet filtering rates based on, for instance, the SrcIP range of packets to be captured or the range of the results of hash operations performed on the SrcIPs, so that the ratio of ON period/OFF period of the client 40-Web server 31 segment, or in other words, the ratio of response waiting period/response non-waiting period reaches a desired ratio (for instance, 1:9).

The packet capture section 16 is processing means which performs capture processing on packets that have passed through the filters. At this point, the packet capture section 16 may either accumulate the captured packets, or may hand the packets over to the packet analysis/transaction analysis section 17 as they are being captured. Methods of packet analysis and transaction analysis include cumulative processing, which involves temporarily storing captured packets into a disk or the like, and subsequently performing analysis, and real-time processing, which analyzes packets as they are being captured. The packet capture section 16 and the packet analysis/transaction analysis section 17 are configured in a conventional manner, and therefore will not be described in detail.

Using the system analysis apparatus 10 thus configured, all packets belonging to the same transaction may be captured while reducing the total captured volume. Therefore, by statistically analyzing captured packets, transaction analysis (for instance, analysis of calling relations or processing time of objects) may be achieved at light processing loads. This in turn enables system analysis of high-speed networks in excess of 1 Gbps.

Figure 3:
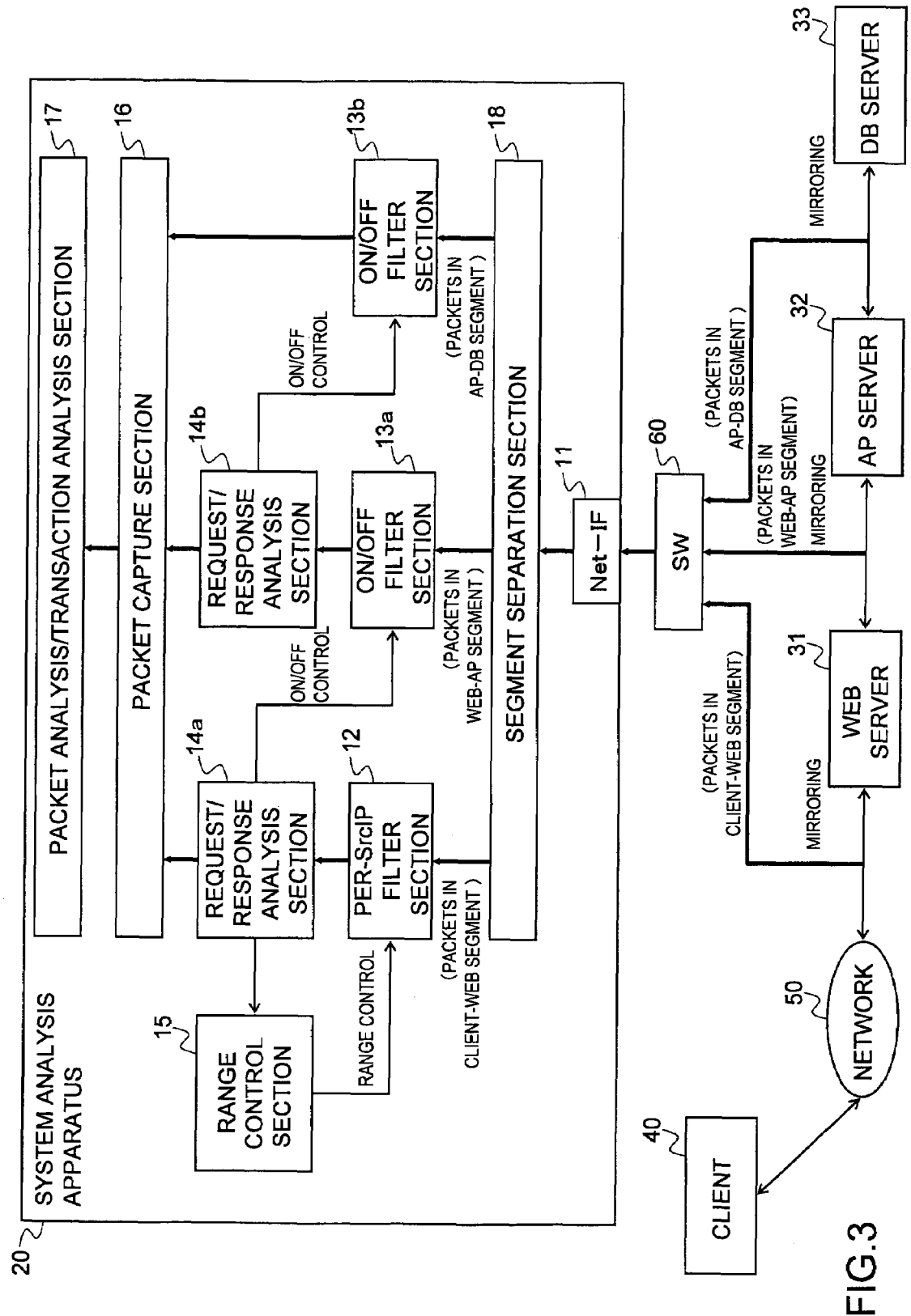
FIG. 3 is an explanatory diagram illustrating a second principle of the present invention.

FIG. 3 is an explanatory diagram illustrating a second principle of the present invention. A system analysis apparatus 20 according to the second principle of the present invention comprises a Net-IF 11, a per-SrcIP filter section 12, ON/OFF filter sections 13 (13a, 13b), request/response analysis sections 14 (14a, 14b), a range control section 15, a packet capture section 16, a packet analysis/transaction analysis section 17, and a segment separation section 18.

According to the second principle of the present invention, mirrored packets of each segment are all gathered at a switch (SW) 60 to be inputted to the system analysis apparatus 20 via a single Net-IF 11. The segment separation section 18 separates packets inputted from the Net-IF 11 into each segment, and transmits the separated packets to the per-SrcIP filter section 12 and the ON/OFF filter section 13 (13a, 13b) of each corresponding segment. Otherwise, the second principle is the same as the first principle shown in FIG. 1, and therefore will not be described.

The system analysis apparatus 20 according to the second principle of the present invention only requires a single Net-IF 11. Unlike the system analysis apparatus 10 according to the first principle, since it is unnecessary to prepare Net-IFs 11 for each segment in which packets will be captured, cost reduction may be achieved in cases where processing is performed on a large number of segments.

Due to the above-described principle, the present invention allows packet sampling to be performed in real-time on a per-transaction basis.

Embodiments of the present invention will now be more specifically described.

First Embodiment

Figure 4:
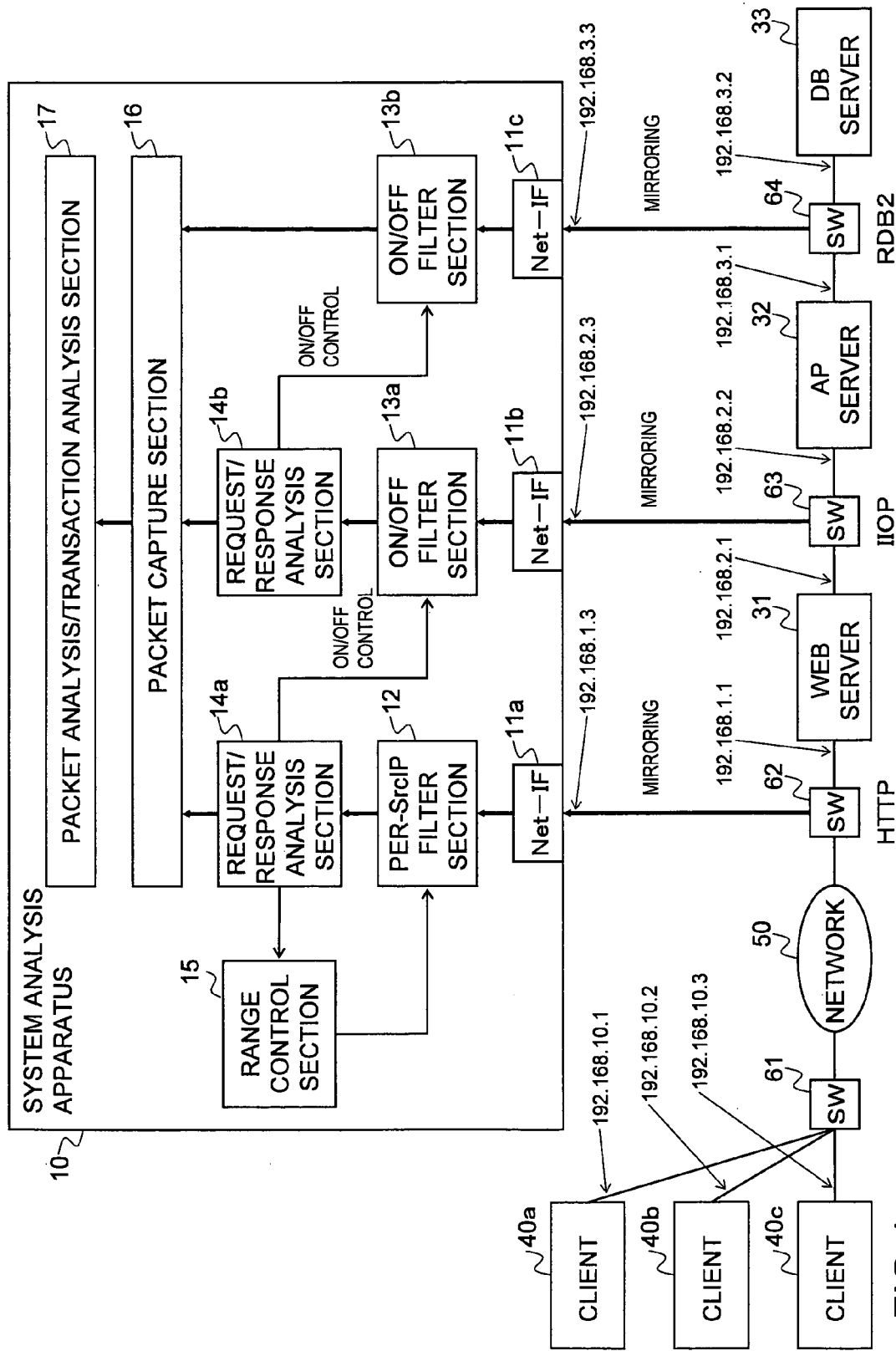
FIG. 4 is a diagram showing an example of a system analysis apparatus according to a first embodiment of the present invention.

FIG. 4 is a diagram showing an example of a system analysis apparatus according to a first embodiment of the present invention. The present embodiment is an embodiment in which mirrored outputs of switches (SWs) 62, 63 and 64 placed in the communication path of each segment are inputted to different network interfaces (Net-IFs) 11a, 11b and 11c of a system analysis apparatus 10. The present embodiment corresponds to the above-described first principle.

The system analysis apparatus 10 comprises Net-IF section 11s (11a, 11b and 11c), a per-SrcIP filter section 12, ON/OFF filter sections 13 (13a, 13b), request/response analysis sections 14 (14a, 14b), a range control section 15, a packet capture section 16, and a packet analysis/transaction analysis section 17. In the present embodiment, system analysis will be performed on a three-tiered server system consisting of a Web server 31, an AP server 32 and a DB server 33. In the present first embodiment, three clients 40 (40a, 40b and 40c) are connected to the SW 61. Each client 40 (40a, 40b and 40c) transmits a request to the Web server 31 and receives a response from the Web server 31 via a network 50. The Web server 31 transmits a request to the AP server 32, and receives a response from the AP server 32. The AP server 32 transmits a request to the DB server 33, and receives a response from the DB server 33.

The clients 40 (a, b and c) are respectively set with IP addresses "192.168.10.1", "192.168.10.2" and "192.168.10.3". At the Web server 31, an IP address "192.168.1.1" is set to the client 40 side, while an IP address "192.168.2.1" is set to the AP server 32 side. At the AP server 32, an IP address "192.168.2.2" is set to the Web server 31 side, while an IP address "192.168.3.1" is set to the DB server 33 side. An IP address "192.168.3.3" is set to the DB server 33. The Net-IFs 11 (a, b and c) of the system analysis apparatus 10 are respectively set with IP addresses "192.168.1.3", "192.168.2.3" and "192.168.3.3". Communication is performed in the client 40-Web server 31 segment, the Web server 31-AP server 32 segment and the AP server 32-DB server 33 segment respectively using HTTP, IIOP and RDB2.

FIGS. 5A to 5D are diagrams showing examples of packet formats. FIG. 5A shows a format of packets mirrored in each segment and inputted to the system analysis apparatus 10. FIG. 5B shows a format of an IP header of a packet. FIG. 5C shows a format of a TCP header of a packet. FIG. 5D shows a format of a flag portion of a TCP header. The formats shown in FIGS. 5A to 5D are general formats of TCP/IP packets.

Figure 6:
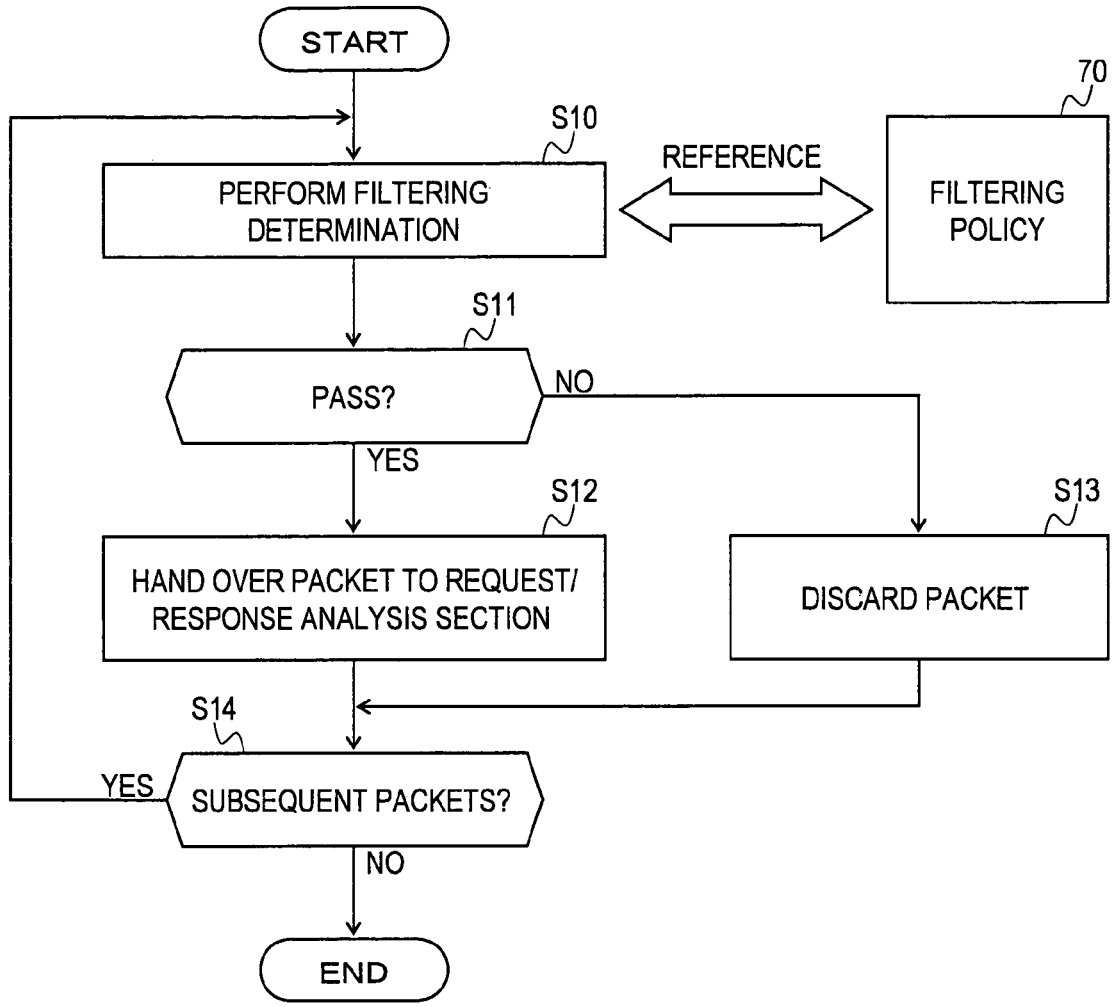
FIG. 6 is a flowchart of processing performed by a per-SrcIP filter section.

FIG. 6 is a flowchart of processing performed by the per-SrcIP filter section. The shown processing is initiated by the per-SrcIP filter section 12 when mirrored packets of the client 40-Web server 31 segment are inputted from the Net-IF 11a to the system analysis apparatus 10.

The per-SrcIP filter section 12 performs filtering determination according to a filtering policy 70 (step S10). Filtering determination involves determining whether inputted packets are passed through by verifying the IP addresses of the inputted packets. A determination logic of whether packets should be captured or discarded using the SrcIPs of requests from the clients 40 as key are defined in the filtering policy 70. The filtering policy 70 may also be predefined by a user, and may be modified during operation.

When the result of filtering determination is to allow packets to pass through, or in other words, to capture packets (step S11), the packet is handed over to the request/response analysis section 14*a* (step S12). When it is determined not to allow packets to pass through, or in other words, not to capture packets (step S11), the packet is discarded as is (step S13). After processing of the packet is completed, determination of whether subsequent packets exist is performed (step S14). If there are subsequent packets, the process returns to the filtering determination of step S10 to perform processing on the new packet. If there are no subsequent packets, the process is concluded.

An example where the filtering policy 70 is to "capture only packets which have "1" as the last digit of their SrcIPs" will now be explained. The filtering determination commences by identifying from the IP address of the Web server 31 whether the direction of a packet originated at the client 40 to be transmitted to the Web server 31, or originated at the Web server 31 to be transmitted to the client 40. Since the IP address of the Web server 31 is recognized by the system analysis apparatus 10 side, either the SrcIP or the DstIP of the packet which is not the IP address of the Web server 31 becomes the IP address of the client 40. When the packet has been transmitted from the client 40 to the Web server 31, the SrcIP is extracted from the packet format. When the packet has been transmitted from the Web server 31 to the client 40, the DstIP is extracted from the packet format. If the last digit of the extracted IP address has been determined to be "1", the packet is captured. If not, the packet is discarded. For instance, in the configuration shown in FIG. 4, only the IP address of the client 40*a* among the three clients 40 (*a*, *b* and *c*) has a last digit of "1". Therefore, for the client 40-Web server 31 segment, only packets that are transmitted from or to the client 40*a* will be captured.

In addition, the filtering policy 70 may be specified to "only capture packets with SrcIPs falling in a certain range", such as "192.168.10.1 to 192.168.10.30". Moreover, the filtering policy 70 may be specified to "perform hash operations on the SrcIPs of the inputted packets, and capture only the packets for which the hash operation results fall in a certain range". Filtering performed using hash operation results reduces biases among the SrcIPs of the packets to be captured.

Figure 7:
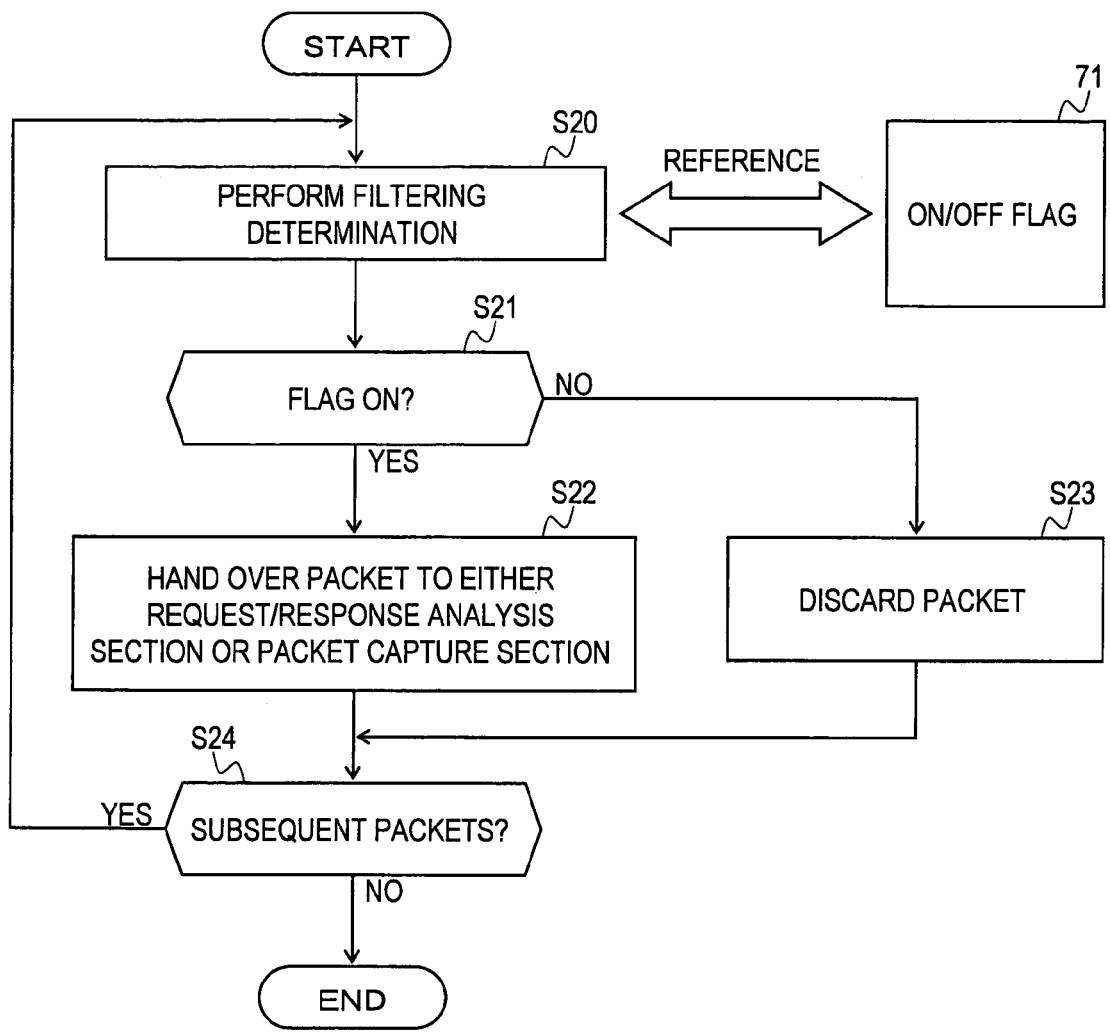
FIG. 7 is a flowchart of processing performed by an ON/OFF filter section.

FIG. 7 is a flowchart of processing performed by the ON/OFF filter sections. The processing is initiated by the ON/OFF filter sections 13 (*a*, *b*) corresponding to each segment when mirrored packets from the Web server 31-AP server 32 segment or the AP server 32-DB server 33 segment are inputted to the system analysis apparatus 10 respectively via the Net-IF 11*b* and the Net-IF 11*c*.

The ON/OFF filter sections 13 perform filtering determination according to ON/OFF flags 71 (step S20). The ON/OFF flags 71 are set/reset by the request/response analysis section 14 of the previous segment. In other words, the ON/OFF filter section 13*a* corresponding to the Web server 31-AP server 32 segment receives an ON signal or an OFF signal from the request/response analysis section 14*a* corresponding to the client 40-Web server 31 segment, while the ON/OFF filter section 13*b* corresponding to the AP server 32-DB server 33 segment receives an ON signal or an OFF signal from the request/response analysis section 14*b* corresponding to the Web server 31-AP server 32 segment. Flags are set (flag ON) when ON signals are received, and are reset (flag OFF) when OFF signals are received. Filtering determination involves determining whether inputted packets are passed through by the ON/OFF status of the flags. When an ON/OFF flag 71 is set to ON (step S21), the packet is captured. Then, in the case of the ON/OFF filter section 13*a*, the packet is handed over to the request/response analysis section 14*a*, while in the case of the ON/OFF filter section 13*b*, the packet is handed over to the packet capture section 16 (step S22). When the ON/OFF flag 71 is set to OFF (step S21), the packet is discarded (step S23).

After processing of the packet is completed, determination of whether subsequent packets exist is performed (step S24). If there are subsequent packets, the process returns to the filtering determination of step S20 to perform processing on the new packet. If there are no subsequent packets, the process is concluded.

While a detailed description will be provided in the description of the request/response analysis section 14 below, the ON/OFF flag 71 is set to ON when the previous segment is in a response waiting state, while the ON/OFF flag 71 is set to OFF when the previous segment is not in a response waiting state. In other words, packets will be captured in the current segment only when the previous segment is in a response waiting state.

The ON/OFF filter sections 13 determine whether packets are captured or discarded using the inclusion relations of the requests/responses. Therefore, while all the packets belonging to the same transaction may be comprehensively captured, there is a possibility that packets belonging to other transactions are captured at the same time. Such packets belonging to other transactions should be determined and filtered by the packet analysis/transaction analysis section 17 during transaction analysis.

Figure 8:
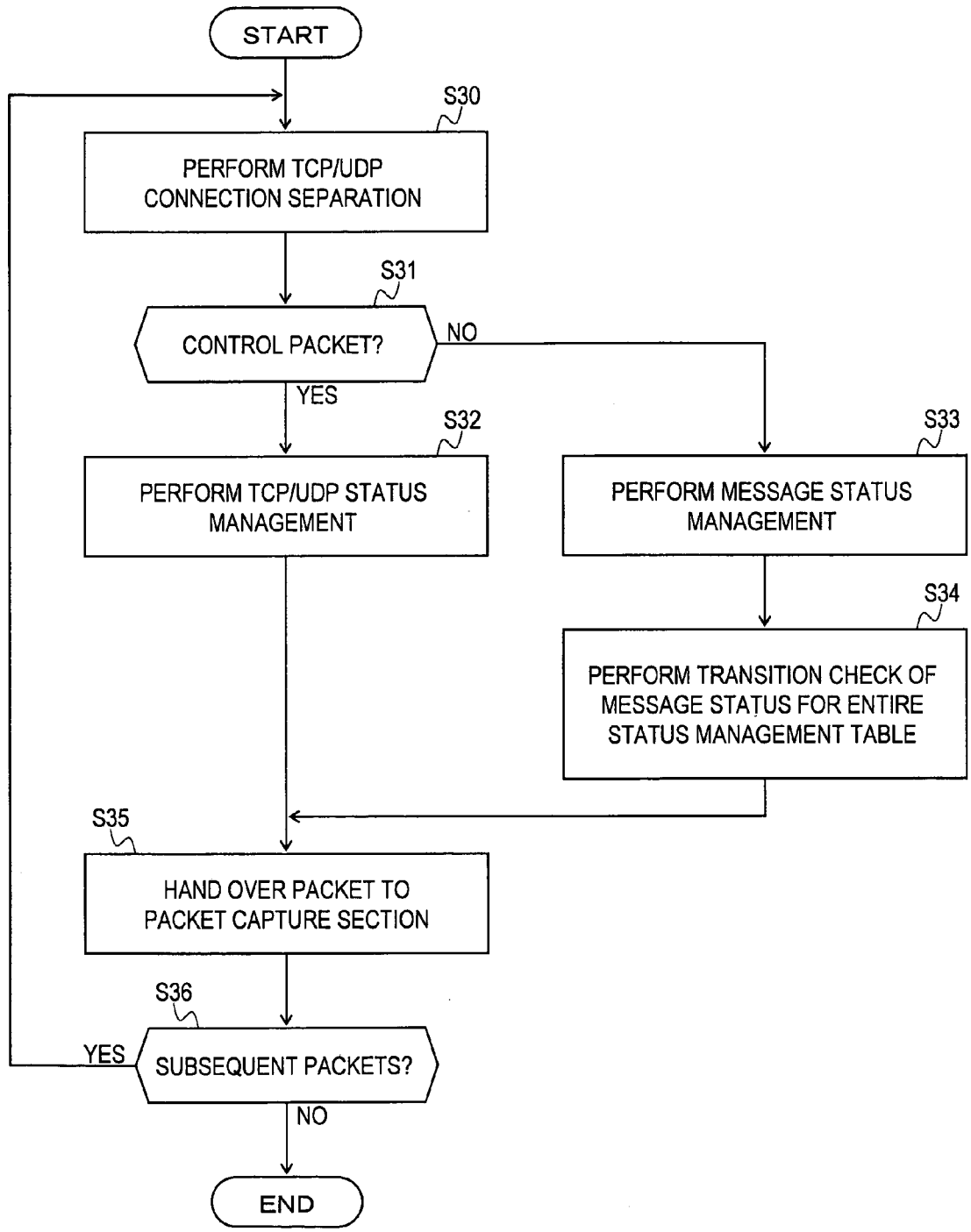
FIG. 8 is a flowchart of processing performed by a request/response analysis section.

FIG. 8 is a flowchart of processing performed by the request/response analysis sections. The processing is initiated by the request/response analysis sections 14 (*a*, *b*) corresponding to each segment when packets are either handed over from the per-SrcIP filter section 12 in the case of the client 40-Web server 31 segment, or from the ON/OFF filter section 13*a* in the case of the Web server 31-AP server 32 segment.

The request/response analysis sections 14 first sort packets to their respective sessions using TCP/UDP connection separation (step 30). TCP sessions are sorted using source and destination IP addresses and port numbers. In addition, the request/response analysis sections 14 investigate which services the sessions belong to by the destination port numbers (server-side receiving port numbers). For instance, if the server-side receiving port number was 80, the session is determined to be a communication (HTTP) with the Web server 31.

Next, determination is performed on a per-sorted session basis of whether a packet is a TCP/UDP control packet or a data packet (step S31). This is determined by checking the flag status in the TCP header or the existence of TCP data. More specifically, if any of the RST, SYN or FIN bits in the flags shown in FIG. 5D are set to ON, the packet is determined to be a control packet. On the other hand, if all of the RST, SYN or FIN bits in the flags shown in FIG. 5D are set to OFF, and TCP data exists, the packet is determined to be a data packet.

In step S31, when a packet is determined to be a control packet, TCP/UDP status management is performed according to the processing sequence of TCP (RFC793) (step S32). In TCP/UDP status management, when a new connection is established, the connection is registered onto a status management table. When an existing connection is closed, the connection is deleted from the status management table. In addition, during TCP/UDP status management, TCP/UDP statuses in the status management table are updated.

FIG. 9 is a diagram showing an example of the status management table. The example shown in FIG. 9 is a status management table 80 for the client 40-Web server 31 segment. The status management table used in the Web server 31-AP server 32 segment has a similar format. The status management table 80 shown in FIG. 9 is composed of information such as source IP address (client-side), destination IP address (Web server-side), source port number, destination port number, TCP/UDP status and message status. In the status management table 80, an entry is provided for each TCP/UDP connection. In the status management table 80 shown in FIG. 9, the client side IP address is set to source IP address because connection is established by a request packet from the client 40 to the Web server 31. In other words, the source IP address, the destination IP address, the source port number and the destination port number have been acquired from a request packet from the client 40 to the Web server 31.

The TCP/UDP status item in the status management table 80 indicates transition of TCP/UDP statuses. In the status management table of FIG. 9, "connecting" indicates that connection/termination processing is in progress, while "connected" indicates that a connection has already been established. In the TCP/UDP status management in step S32, TCP/UDP status values of the status management table 80 are updated according to transitions of connection statuses.

When the packet is determined to be a data packet in step S31, message status management is performed (step S33). In message status management, determination of whether a message is a request or a response is first performed based on packet direction using IP addresses as keys. For instance, in the client 40-Web server 31 segment, when the packet has been transmitted from the client 40 to the Web server 31, or in other words, if the source IP address of the packet is the IP address of the client 40 and the destination IP address is the IP address of the Web server 31, the message is a request. On the other hand, if the packet has been transmitted from the Web server 31 to the client 40, or in other words, if the source IP address of the packet is the IP address of the Web server 31 and the destination IP address is the IP address of the client 40, the message is a response.

If such status changes have resulted in changes in the message status, the message status of the status management table 80 will be updated. For this example, the following two message statuses are defined:

"Resp-wait: response waiting state after receiving request"
"No-resp-wait: states other than Resp-wait"

The above message statuses are significant only when the TCP/UDP status is "connected". When the TCP/UDP status is "connecting", the above message statuses are N/A (not applicable).

In a new connection, when a TCP connection has been established, the message status is No-resp-wait. When a request is subsequently received, the message status is updated to Resp-wait. When a further response is subsequently received, the message status is updated to No-resp-wait.

After message status management, a transition check of the message statuses throughout the entire status management table 80 is performed (step S34). At this point, if required, an ON/OFF signal is issued to the ON/OFF filter section 13 of the next stage. More specifically, ON/OFF signals are issued in the following cases.

When a Resp-wait newly occurs in a state where there are no Resp-waits in the status management table 80, an ON signal is issued to the ON/OFF filter section 13 of the next stage. At this point, the issuance time and type (in this case, an ON signal) of the signal are recorded onto the signal table.

When a transition is made from a state where there are Resp-waits in the status management table 80 to a state where there are no Resp-waits, an OFF signal is issued to the ON/OFF filter section 13 of the next stage. At this point, the issuance time and type (in this case, an OFF signal) of the signal are recorded onto the signal table.

FIG. 10 is a diagram showing an example of a signal table. The signal table 81 is a log-format table which sequentially records issuance times and types of signals starting from the start up of the system. Upon start up of the system, the time of system activation is recorded. As shown in FIG. 10, ON and OFF signals always occur alternately. The signal table 81 is used in the processing by the range control section 15, to be described later, for determining the total duration of ON and OFF periods during a previous certain time period.

In both cases where the packet is a control packet or a data packet, the packet is handed over to the packet capture section 16 (step S35). Next, determination of whether subsequent packets exist is performed (step S36). If there are subsequent packets, the process returns to the TCP/UDP connection separation of step S30 to perform processing on the new packets. If there are no subsequent packets, the process is concluded.

Figure 11:
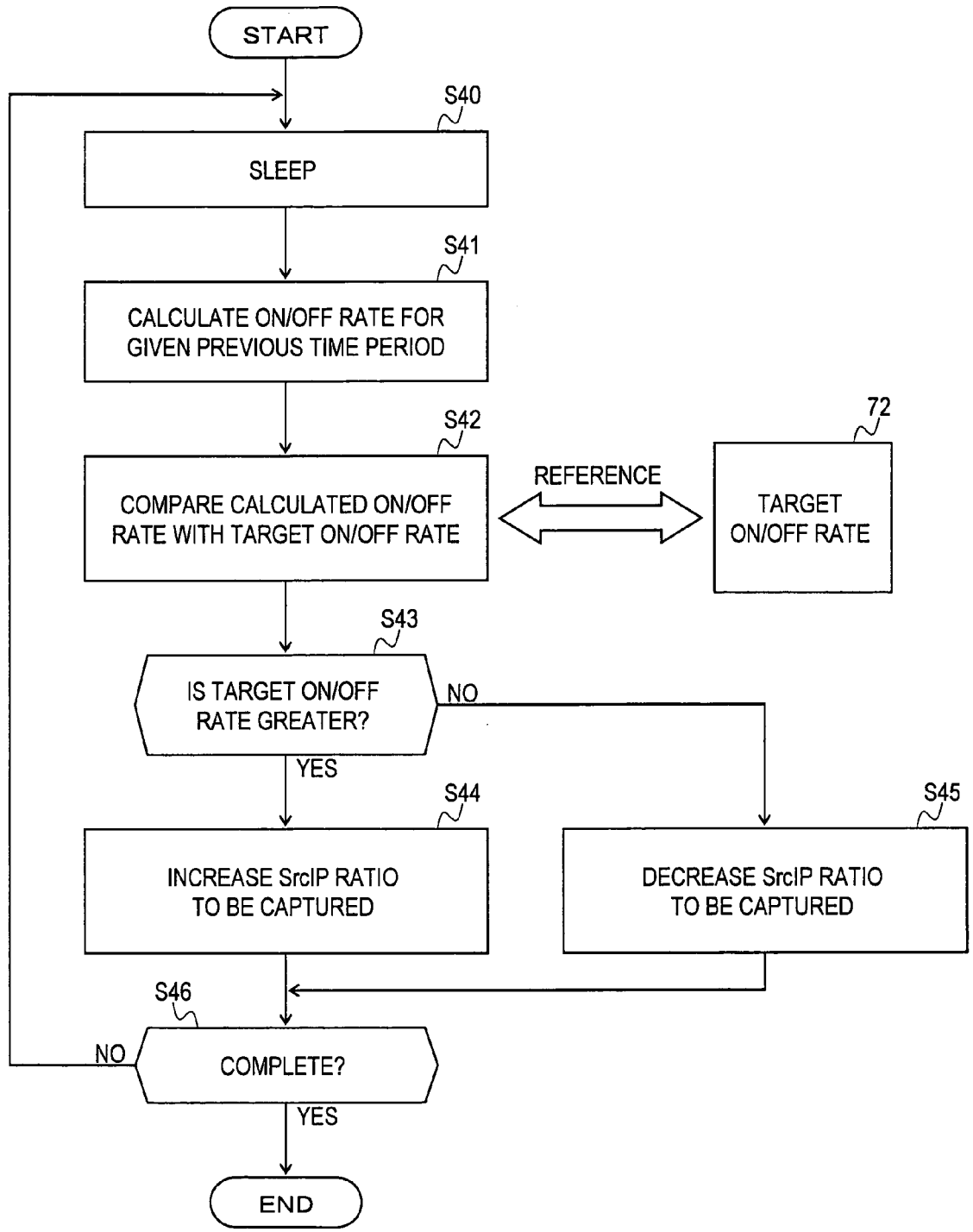
FIG. 11 is a flowchart of processing performed by a range control section.

FIG. 11 is a flowchart of processing performed by the range control section. The processing is initiated by the range control section 15 upon activation of the system. The range control section 15 first sleeps for a certain period of time (for instance, 10 minutes) (step S40), and calculates the ON/OFF rate for that period (step S41). For ON/OFF rate calculation, the total sum of the ON periods for a specified period to the total sum of the OFF periods for the same period is obtained from the records of the signal table 81. The calculated ON/OFF rate is then compared to a target ON/OFF rate 72 (step S42). The target ON/OFF rate 72 is an ON/OFF rate target value (for instance, ⅑). The target ON/OFF rate 72 may be predefined by a user, and may be modified during operation.

When the target ON/OFF rate 72 is greater (step S43), the ratio of SrcIPs to be captured is increased (step S44). For instance, in a case where only the packets with "1" as the last digits of their SrcIPs have been captured, the filtering policy 70 of the per-SrcIP unit filter section 12 is updated so that packets with "1 or 2" as the last digits of their SrcIPs will be captured. When the target ON/OFF rate 72 is smaller (step S43), the ratio of SrcIPs to be captured is decreased (step S45). For instance, in a case where the packets with "1, 2 or 3" as the last digits of their SrcIPs have been captured, the filtering policy 70 of the per-SrcIP unit filter section 12 is updated so that packets with "1 or 2" as the last digits of their SrcIPs will be captured.

Then, determination is performed on whether there is a termination instruction from an administrator (step S46). If there is no termination instruction from the administrator, the range control section 15 returns to its sleep state over a certain time period of step S40. If there is a termination instruction from the administrator, the processing is terminated.

Figure 12:
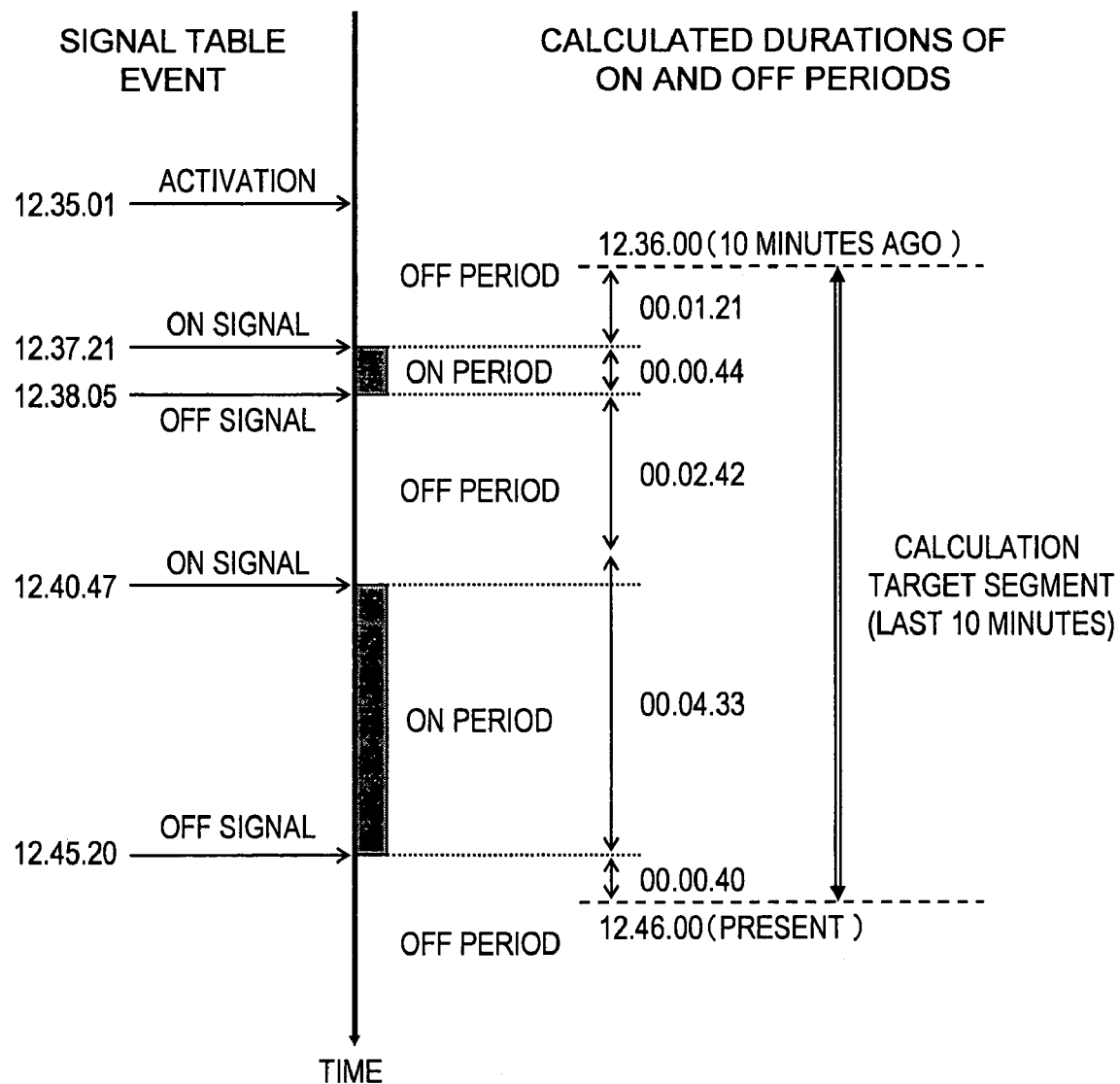
FIG. 12 is a diagram explaining an example of ON/OFF rate calculation.

FIG. 12 is a diagram explaining an example of ON/OFF rate calculation. For this case, it is assumed that the current time is 12.46.00 (the notation represents [time.minute.second], which will hereinafter remain the same), and that the ON/OFF rate to be obtained is "total sum of ON periods/total sum of OFF periods" for the last 10 minutes. In FIG. 12, events included in the signal table 81 of FIG. 10 are plotted to the left of the temporal axis. Note that the decimal places of seconds are rounded off. From the shown occurrence state of events, the ON and OFF periods as well as the durations for each period are obtained as shown to the right of the temporal axis. For instance, since an ON signal has been issued at 12.37.21 and an OFF signal has been issued at 12.38.05, the period beginning at 12.37.21 and ending at 12.38.05 is deduced to be an ON period, and the duration thereof is obtained by subtraction as 00.00.44. As seen, determination of each segment is performed to decide whether the segment is an ON period or an OFF period, and the duration of each period is obtained. Through calculating the previous 10 minutes from the current time of 12.46.00 as the calculation target segment, the total sums of ON and OFF periods may be respectively obtained from FIG. 12 as 317 and 283 seconds. Thus, the ON/OFF rate is obtained as:

"total sum of ON periods/total sum of OFF periods=317/283=1.12"

The packet capture section 16 and the packet analysis/transaction analysis section 17 according to the present embodiment perform conventional processing of packet capturing, packet analysis and transaction analysis. Since these are all conventional art, detailed descriptions of the above processing will be omitted. In addition, as explained in the description of the principles of the present invention, the packet capture section 16 may either accumulate the captured packets, or may hand the packets over to the packet analysis/transaction analysis section 17 as they are being captured.

Second Embodiment

Figure 13:
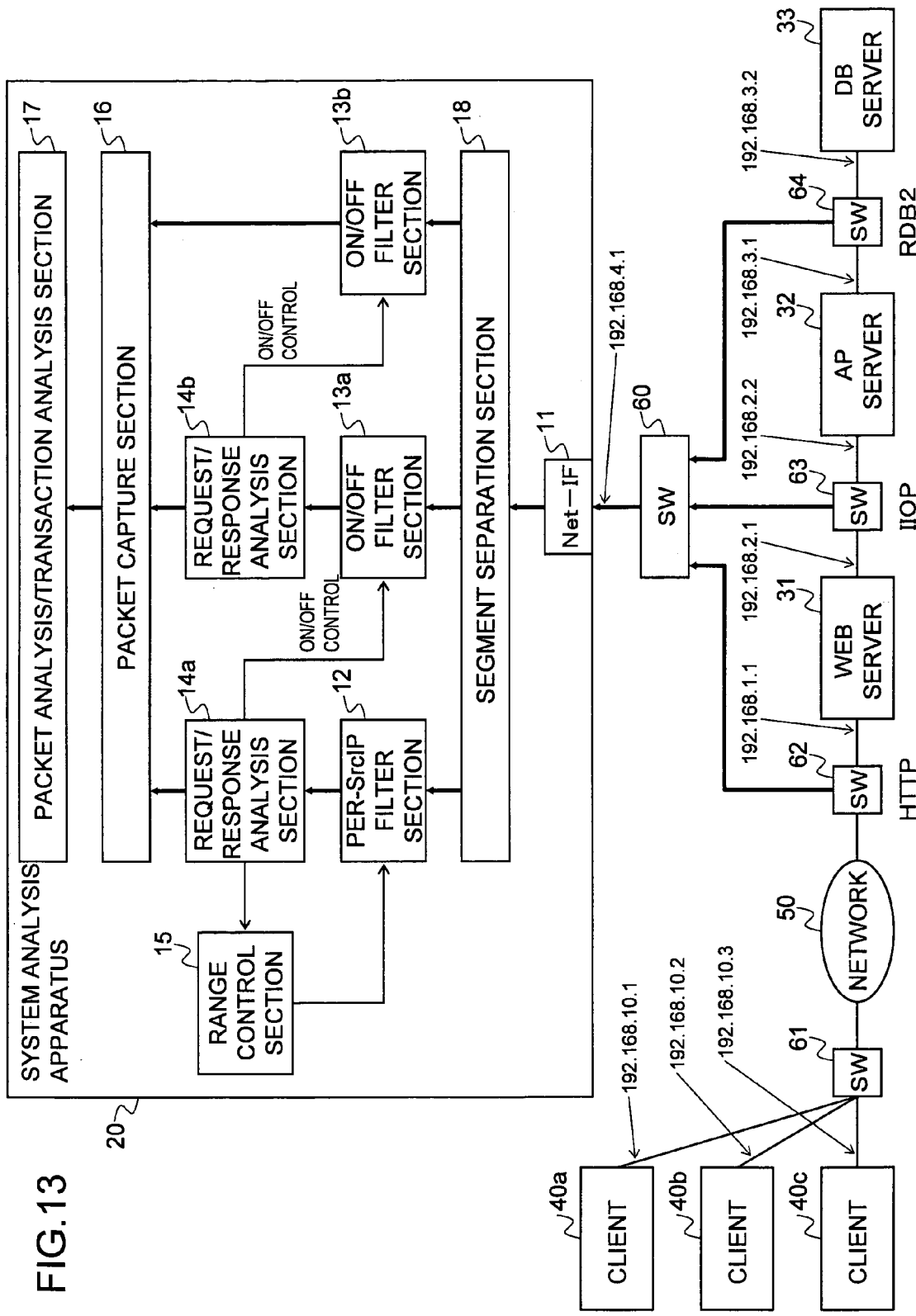
FIG. 13 is a diagram showing an example of a system analysis apparatus according to a second embodiment of the present invention.

FIG. 13 is a diagram showing an example of a system analysis apparatus according to a second embodiment of the present invention. The present embodiment is an embodiment in which mirrored outputs of switches (SWs) 62, 63 and 64 placed in the communication path of each segment are inputted to a single network interface Net-IF 11 of a system analysis apparatus 20. The present embodiment corresponds to the above-described second principle.

The system analysis apparatus 20 comprises the Net-IF 11, a per-SrcIP filter section 12, ON/OFF filter sections 13 (a, b), request/response analysis sections 14 (a, b), a range control section 15, a packet capture section 16, a packet analysis/transaction analysis section 17, and a segment separation section 18. Compared to the system analysis apparatus 10 of the first embodiment, the number of Net-IF sections 11 has been reduced from three to one and a segment separation section 18 has been newly added for the configuration of the system analysis apparatus 20 of the present embodiment.

The configuration of the server system itself is the same as the configuration of the server system of the first embodiment shown in FIG. 4. However, the configuration of the section which loads mirrored packets to the system analysis apparatus 20 differs from that of the first embodiment shown in FIG. 4. In the present invention, all mirrored outputs of switches (SWs 62, 63 and 64) placed in the communication path of each segment are sent to the system analysis apparatus 20 via a switch (SW 60). In addition, the IP addresses set to the various apparatuses of the present embodiment are identical to those set in the first embodiment shown in FIG. 4, with the exception of an IP address "192.168.4.1" set to the Net-IF 11 of the system analysis apparatus 20.

Processing performed by the per-SrcIP filter section 12, the ON/OFF filter sections 13, the request/response analysis sections 14, the range control section 15, the packet capture section 16, and the packet analysis/transaction analysis section 17 of the system analysis apparatus 20 of the first embodiment are the same as the processing performed in the system analysis apparatus 10 of the first embodiment, and therefore will not be described here. Below, only a description of the processing performed by the segment separation section 18 which was absent from the system analysis apparatus 10 of the first embodiment will be provided.

Figure 14:
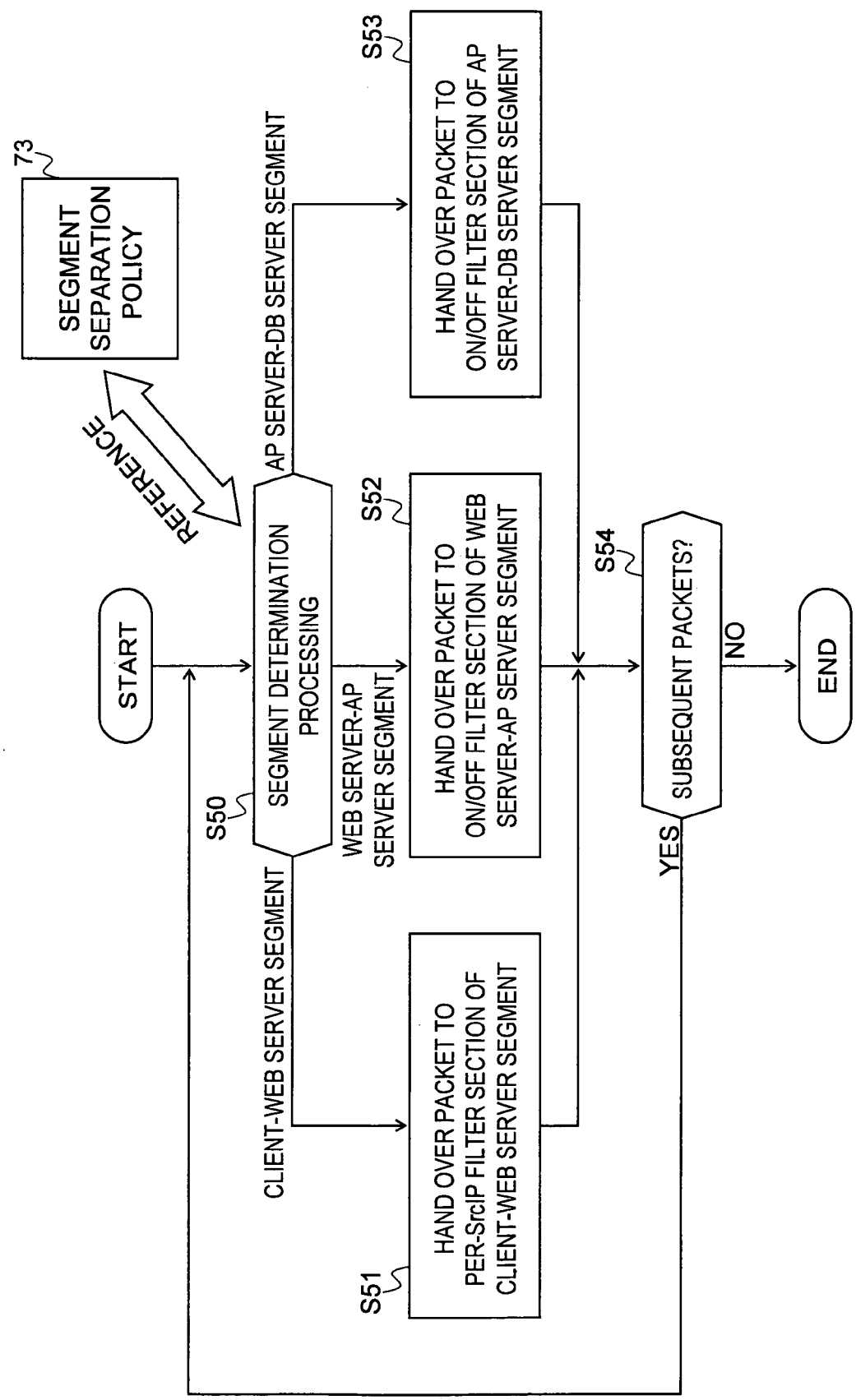
FIG. 14 is a flowchart of processing performed by a segment separation section.
Figure 15:
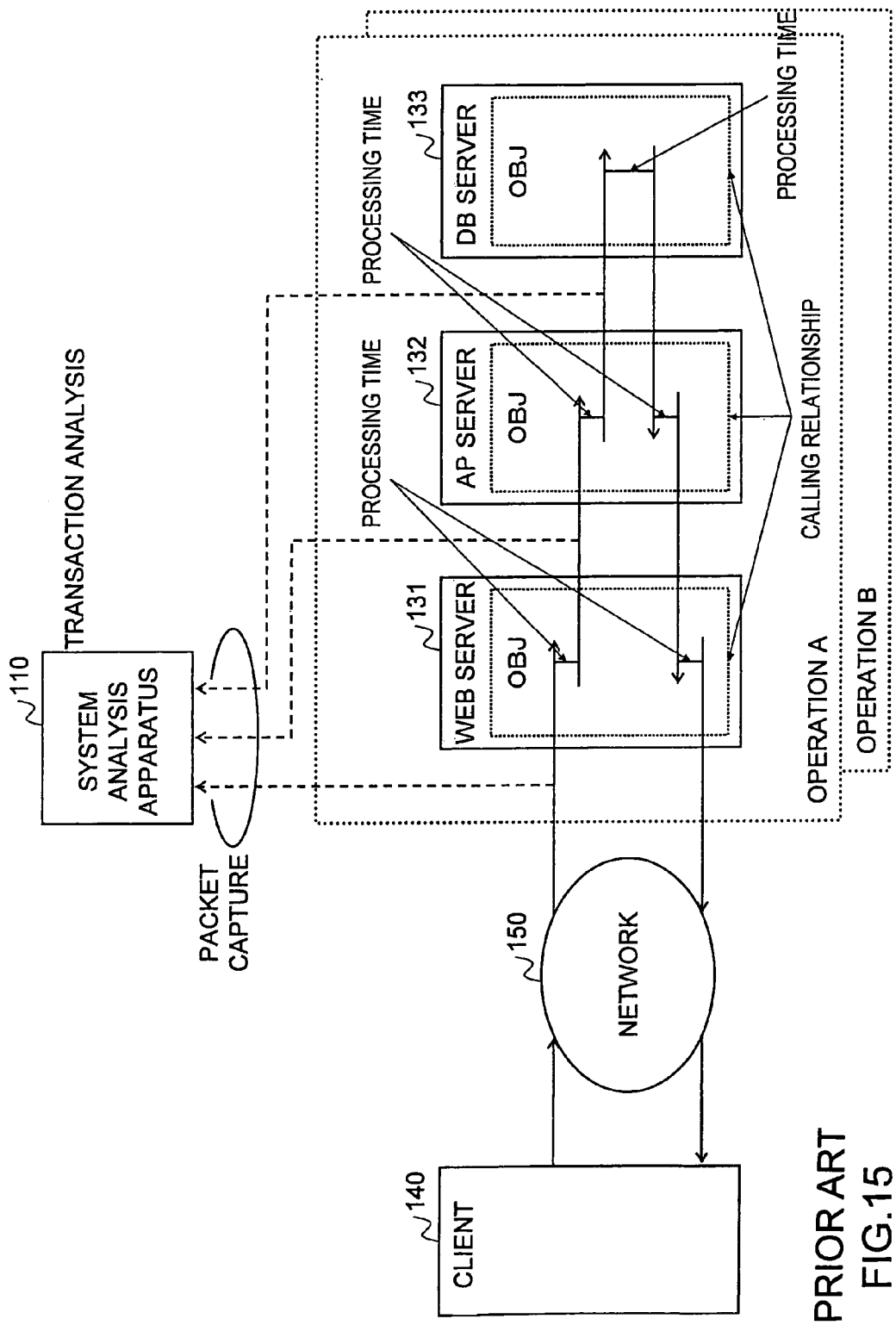
FIG. 15 is a diagram showing an example of a system to which a system analysis apparatus is applied.
Figure 16:
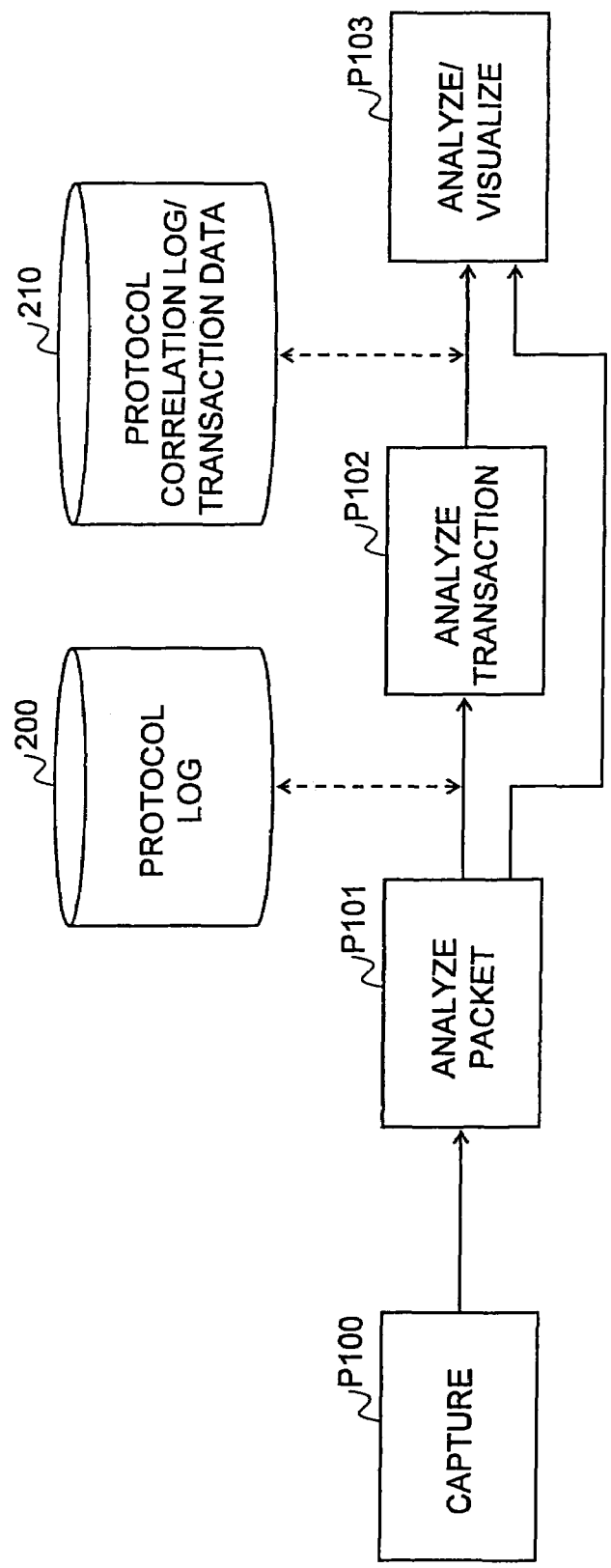
FIG. 16 is a diagram showing a flow of system analysis processing.
Figure 17A:
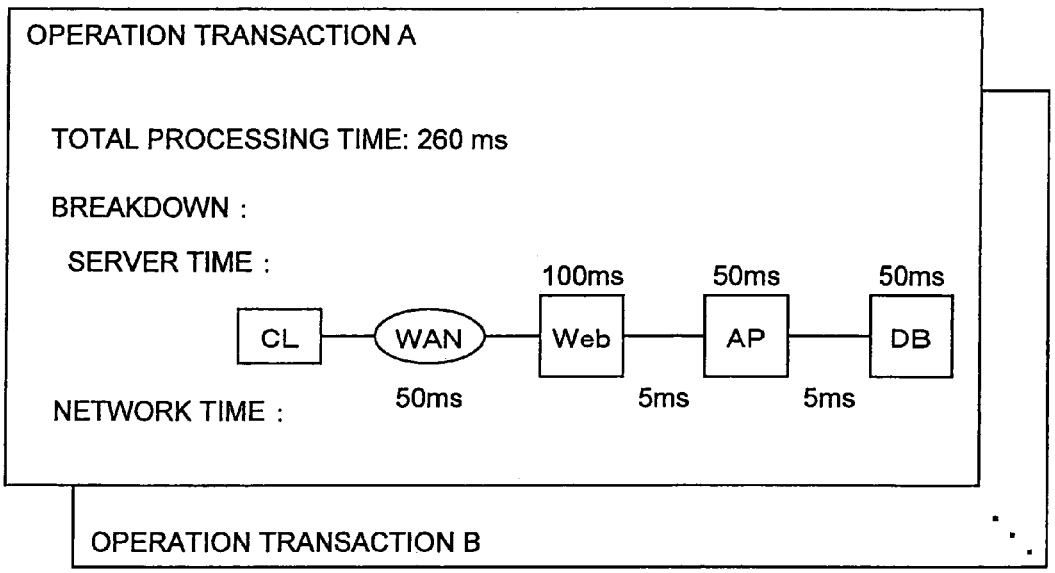
FIGS. 17A and 17B are diagrams showing examples of visualization output.
Figure 17B:
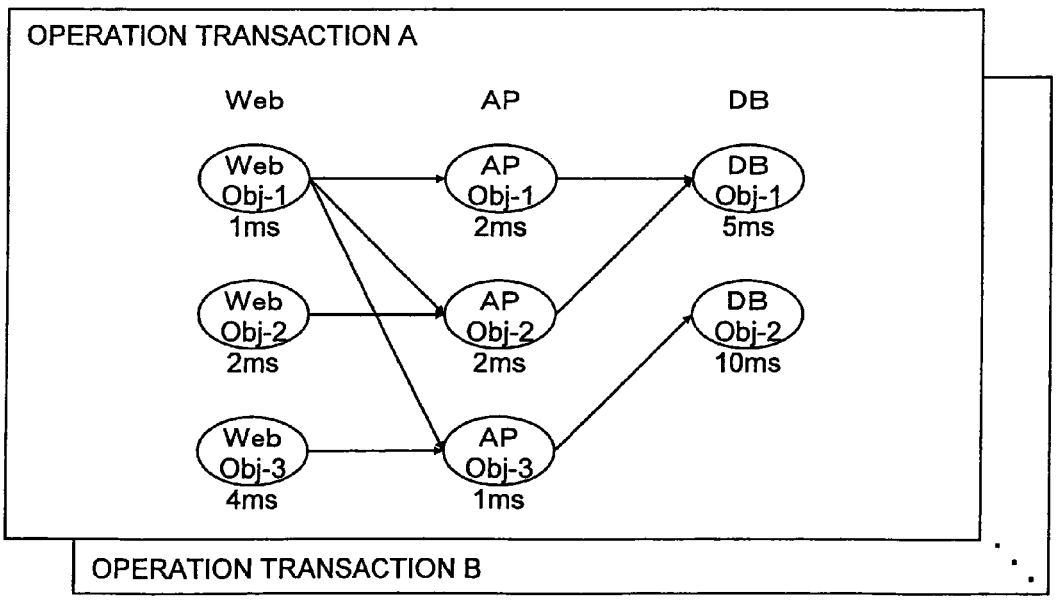
Figure 18A:
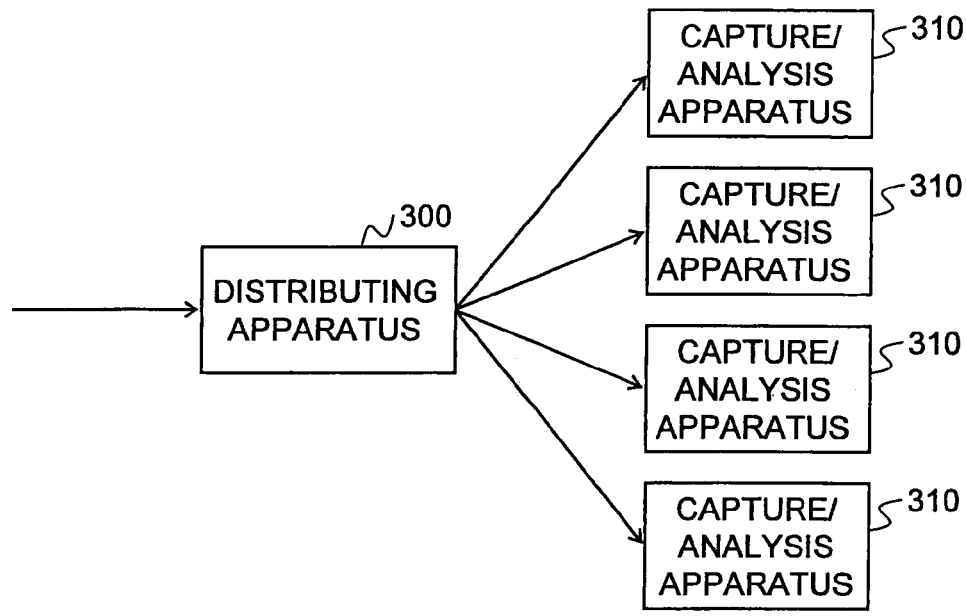
FIGS. 18A and 18B are diagrams showing examples of methods for capturing and transaction analysis.
Figure 18B:
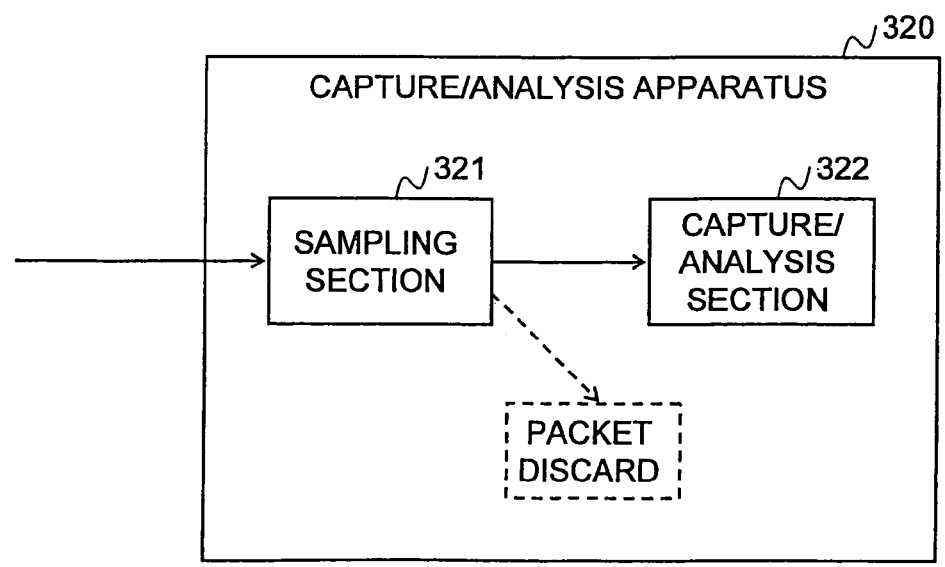

FIG. 14 is a flowchart of processing performed by the range control section. The processing is initiated by the segment separation section 18 upon input of a mirrored packet from the Net-IF 11 to the system analysis apparatus 20.

The segment separation section 18 performs segment determination processing according to a segment separation policy 73 (step S50). The segment determination processing involves determining a segment through which the inputted packet is flowing by performing matching determination of the IP address, port number and the like of the inputted packet. The segment separation policy 73 defines a determination logic for determining a segment through which the inputted packet is flowing by performing matching determination of the IP address, port number and the like of the packet. The segment separation policy 73 may be predefined by a user, and may be modified during operation.

In the example of the server system shown in FIG. 13, the segment separation policy 73 may preferably be defined, for instance, as described in the items 1) to 3) below.

1) When the source IP address or the destination IP address of a packet is "192.168.1.1", the packet is determined to be flowing through the client 40-Web server 31 segment.
2) When the source IP address of a packet is "192.168.2.1" and the destination IP address of the packet is "192.168.2.2", or when the source IP address of a packet is "192.168.2.2" and the destination IP address of the packet is "192.168.2.1", the packet is determined to be flowing through the Web server 31-AP server 32 segment.
3) When the source IP address of a packet is "192.168.3.1" and the destination IP address of the packet is "192.168.3.2", or when the source IP address of a packet is "192.168.3.2" and the destination IP address of the packet is "192.168.3.1", the packet is determined to be flowing through the AP server 32-DB server 33 segment.

When the inputted packet is a packet flowing through the client 40-Web server 31 segment, the packet is handed over to the per-SrcIP filter section 12 corresponding to the client-Web segment (step S51). When the inputted packet is a packet flowing through the Web server 31-AP server 32 segment, the packet is handed over to the ON/OFF filter section 13a corresponding to the Web server 31-AP server 32 segment (step S52). When the inputted packet is a packet flowing through the AP server 32-DB server 33 segment, the packet is handed over to the ON/OFF filter section 13b corresponding to the AP server 32-DB server 33 segment (step S53).

After processing of the packet is completed, determination of whether subsequent packets exist is performed (step S54). If there are subsequent packets, the process returns to the segment determination processing of step S50 to perform processing on the new packet. If there are no subsequent packets, the process is concluded.

A brief description of advantageous effects which may be expected from the present invention described through the two embodiments will now be provided. In the following example, traffic is assumed to be homogeneous.

According to the present invention, the filtering range of packets in the client 40-Web server 31 segment may be refined by the per-SrcIP filter section 12 of the system analysis apparatus 10 using the SrcIP range. In addition, the SrcIP range may be adjusted by the range control section 15 to dynamically change the refining of the sampling range at the per-SrcIP filter section 12. For instance, by refining the sampling rate of packets in the client 40-Web server 31 segment by the per-SrcIP filter section 12 to ¹/₁₀, the processing load of transaction analysis or the amount of apparatuses necessary for handling transaction analysis may be reduced to ¹/₁₀.

Moreover, filtering of packets in the Web server 31-AP server 32 segment, which is the segment following the client 40-Web server 31 segment, is linked to the filtering rate in the client 40-Web server 31 segment by the request/response analysis section 14b. Therefore, it is contemplated that by refining the sampling rate for the client 40-Web server 31 segment to ¹/₁₀, the sampling rate for the segment following the client 40-Web server 31 segment is also refined to ¹/₁₀.

The degree of refining sampling rates is related to the accuracy of transaction analysis. In order to achieve an accuracy of ±5% in statistical processing, more than 1500 samples are required. Therefore, in order to improve the accuracy of transaction analysis, either the number of samples should be increased, or the sampling period (the unit period of transaction analysis) should be extended. However, accuracy of transaction analysis is not directly determined by sampling rates alone. For instance, when the input is 15,000 transactions/second, the above accuracy may be achieved in per-second transaction analysis by performing sampling at 1,500 transactions/second. In this case, the reduction rate is ¹/₁₀. In addition, in order to obtain the above accuracy for transaction analysis on a per-10 seconds basis, sampling should be performed at 150 transactions/second. In this case, the reduction rate is ¹/₁₀₀.

What is claimed is:

1. A system analysis apparatus which performs analysis on a per-transaction basis on a multi-tiered server system which performs predetermined processing in response to a request from a client by distributing the processing among servers configured in multiple tiers, the system analysis apparatus comprising: a network interface section which separates packets mirrored from packets flowing in client-server segments, which are data communication segments between a client and a server of the multi-tiered server system where the server is a request transmission target of the client, or server-server segments, which are data communication segments between servers of adjacent tiers in the multi-tiered server system, into each segment, and acquires the packets; a first filter section which filters packets flowing through the client-server segments based on address information of the client which is the source of the packets; a second filter section in which an ON period during which packets flowing through the server-server segments are acquired and an OFF period during which the packets are discarded are switchably set by an external control signal, where the second filter section filters the packets in response to settings of the ON period or the OFF period; a request/response analysis section which determines packets acquired from a single segment related in advance to the request/response analysis section among the client-server segments or the server-server segments, identifies a request waiting period of the request transmitting side of the segment based on message statuses of the packets, and controls the settings of the ON period or OFF period of the second filter section, which filters packets of a server-server segment which is next to the segment, in conjunction with the request waiting period; and a packet capture section which acquires packets passing through the first filter section or the second filter section.

2. The system analysis apparatus according to claim 1, wherein the network interface section is provided as a plurality of components which correspond to each segment of the client-server segment and the server-server segments, and acquires packets mirrored in each corresponding segment.

3. The system analysis apparatus according to claim 1, comprising a segment separation section which separates packets acquired by the network interface section into each segment through which the packets had been flowing, wherein the network interface section is provided as a single component capable of collectively acquiring packets mirrored from packets flowing through the client-server segments and the server-server segments and sending out the acquired packets to the segment separation section.

4. The system analysis apparatus according to claim 1, wherein the first filter section acquires packets flowing through the client-server segments at a predetermined rate for each source IP address of the packets.

5. The system analysis apparatus according to claim 4, comprising a range control section which identifies a response waiting period and a period other than the response waiting period of the client side based on message statuses of packets passed through the first filter section, and changes the filtering rate of the first filter section so that a ratio of the two periods are at a predetermined ratio.

6. The system analysis apparatus according to claim 1, wherein the first filter section comprises a filtering policy which identifies, using all client IP addresses or a portion thereof, a range of clients from which packets are acquired, in order to acquire packets having source IP addresses matching the filtering policy from the packets flowing through the client-server segments.

7. The system analysis apparatus according to claim 1, wherein the first filter section performs hash operations on the source IP addresses of packets flowing through the client-server segments and acquires packets for which the hash operation results fall into a predetermined range.

8. The system analysis apparatus according to claim 1, wherein the request/response analysis section determines message statuses of packets filtered from the corresponding segment, and based on the determination results, sends a control signal which sets an ON period to the second filter section when a request transmitting side of the segment has issued a request, and sends a control signal which sets an OFF period to the second filter section when the request transmitting side has received a response.

9. A system analysis method for performing analysis on a per-transaction basis on a multi-tiered server system which performs predetermined processing in response to a request from a client by distributing the processing among servers configured in multiple tiers, the system analysis method comprising: a network interface processing step for separating packets mirrored from packets flowing in client-server segments, which are data communication segments between a client and a server of the multi-tiered server system where the server is a request transmission target of the client, or server-server segments, which are data communication segments between servers of adjacent tiers in the multi-tiered server system, into each segment, and acquiring the packets; a first filter processing step for filtering packets flowing through the client-server segments based on address information of the client which is the source of the packets; a second filter processing step, in which an ON period during which packets flowing through the server-server segments are acquired and an OFF period during which the packets are discarded are switchably set by an external control signal, for filtering the packets in response to settings of the ON period or the OFF period; a request/response analysis processing step for determining packets acquired from a single segment related to the request/response analysis processing step in advance among the client-server segments or the server-server segments, identifying a request waiting period of the request transmitting side of the segment based on message statuses of the packets, and controlling the settings of the ON period or OFF period of the second filter processing step, which filters packets of a server-server segment which is next to the segment, in conjunction with the request waiting period; and a packet capture processing step for acquiring packets passing through the first filter section or the second filter section.

10. The system analysis method according to claim 9, wherein the network interface processing step is provided as a plurality of components which correspond to each segment of the client-server segments and the server-server segments, and acquires packets mirrored in each corresponding segment.

11. The system analysis method according to claim 9, comprising a segment separation processing step for separating packets acquired by the network interface section into each segment through which the packets have been flowing, wherein the network interface processing step is provided as a single component capable of collectively acquiring packets mirrored from packets flowing through the client-server segments and the server-server segments and sending out the acquired packets to the segment separation processing step.

12. The system analysis method according to claim 9, wherein packets flowing through the client-server segments are acquired in the first filter processing step at a predetermined rate for each source IP address of the packets.

13. The system analysis method according to claim 12, comprising a range control processing step for identifying a response waiting period and a period other than the response waiting period of the client side based on message statuses of packets passed through in the first filter processing step, and changing the filtering rate of the first filter section so that a ratio of the two periods are at a predetermined ratio.

14. The system analysis method according to claim 9, wherein the first filter processing step comprises a filtering policy which identifies, using all client IP addresses or a portion thereof, a range of clients from which packets are acquired, in order to acquire packets having source IP addresses matching the filtering policy from the packets flowing through the client-server segments.

15. The system analysis method according to claim 9, wherein the first filter processing step performs hash operations on the source IP addresses of packets flowing through the client-server segments and acquires packets for which the hash operation results fall into a predetermined range.

16. The system analysis method according to claim 9, wherein the request/response analysis processing step determines message statuses of packets filtered from the corresponding segment, and based on the determination results, sends a control signal which sets an ON period in the second filter processing step when a request transmitting side of the segment has issued a request, and sends a control signal which sets an OFF period in the second filter processing step when the request transmitting side has received a response.

* * * * *